United States Patent
Hirata et al.

(10) Patent No.: US 9,125,142 B2
(45) Date of Patent: Sep. 1, 2015

(54) NODE APPARATUS, COMMUNICATION SYSTEM, AND CHANNEL SELECTION METHOD

(75) Inventors: Shinichi Hirata, Kawasaki (JP); Jun Hasegawa, Akashi (JP); Takahiro Koharagi, Tokyo (JP); Hiroaki Kawasumi, Tokyo (JP); Katsumi Kobayashi, Tokyo (JP); Masashi Kuwahara, Fukushima (JP); Takuji Furusawa, Tokyo (JP); Masaharu Nozawa, Shizuoka (JP)

(73) Assignee: FUJITSU LIMITED, Kawasaki (JP)

( * ) Notice: Subject to any disclaimer, the term of this patent is extended or adjusted under 35 U.S.C. 154(b) by 512 days.

(21) Appl. No.: 13/485,188

(22) Filed: May 31, 2012

(65) Prior Publication Data

US 2012/0307681 A1    Dec. 6, 2012

(30) Foreign Application Priority Data

Jun. 1, 2011   (JP) ................................ 2011-123708

(51) Int. Cl.
*H04W 72/04* (2009.01)
*H04W 48/16* (2009.01)
*H04W 72/12* (2009.01)
*H04W 84/18* (2009.01)

(52) U.S. Cl.
CPC .............. *H04W 48/16* (2013.01); *H04W 72/04* (2013.01); *H04W 72/1289* (2013.01); *H04W 84/18* (2013.01)

(58) Field of Classification Search
USPC .................... 370/254, 310, 329, 349; 709/224
See application file for complete search history.

(56) References Cited

U.S. PATENT DOCUMENTS

| 8,295,254 | B2 | 10/2012 | Kim et al. | |
|---|---|---|---|---|
| 8,743,845 | B2* | 6/2014 | Horn et al. | 370/336 |
| 2006/0268823 | A1* | 11/2006 | Kim et al. | 370/349 |
| 2007/0038743 | A1* | 2/2007 | Hellhake et al. | 709/224 |
| 2009/0290518 | A1* | 11/2009 | Gossain et al. | 370/310 |
| 2010/0103850 | A1* | 4/2010 | Gossain et al. | 370/312 |
| 2010/0290416 | A1* | 11/2010 | Ko et al. | 370/329 |
| 2011/0191473 | A1 | 8/2011 | Sakai et al. | |

FOREIGN PATENT DOCUMENTS

| CN | 1859257 | 11/2006 |
|---|---|---|
| CN | 101765117 | 6/2010 |

(Continued)

OTHER PUBLICATIONS

Office Action issued Jun. 30, 2014 in corresponding Chinese Patent Application No. 201210177970.X.

*Primary Examiner* — Vincelas Louis
(74) *Attorney, Agent, or Firm* — Staas & Halsey LLP

(57) ABSTRACT

A node apparatus for forming a wireless ad-hoc network, including: a recognition possibility determination unit that determines whether or not a gateway apparatus connecting the wireless ad-hoc network to other network can be recognized; an adjoining node detection unit that detects other node apparatus which is the source of a received packet as an adjoining node; a channel switching unit that switches, when the recognition possibility determination unit determines that the gateway apparatus cannot be recognized, the channel used for reception of packets transmitted in the wireless ad-hoc network successively to each of a plurality of channels; and a channel selection unit that selects a channel to be used for communication in the wireless ad-hoc network based on the number of adjoining nodes detected by the adjoining node detection unit in each of the plurality of channels.

10 Claims, 22 Drawing Sheets

(56) References Cited

FOREIGN PATENT DOCUMENTS

| | | |
|---|---|---|
| JP | 2009-200583 | 9/2009 |
| JP | 2009-206999 | 9/2009 |
| JP | 2010-35068 | 2/2010 |
| JP | 2010-93448 | 4/2010 |
| JP | 2010-187316 | 8/2010 |

* cited by examiner

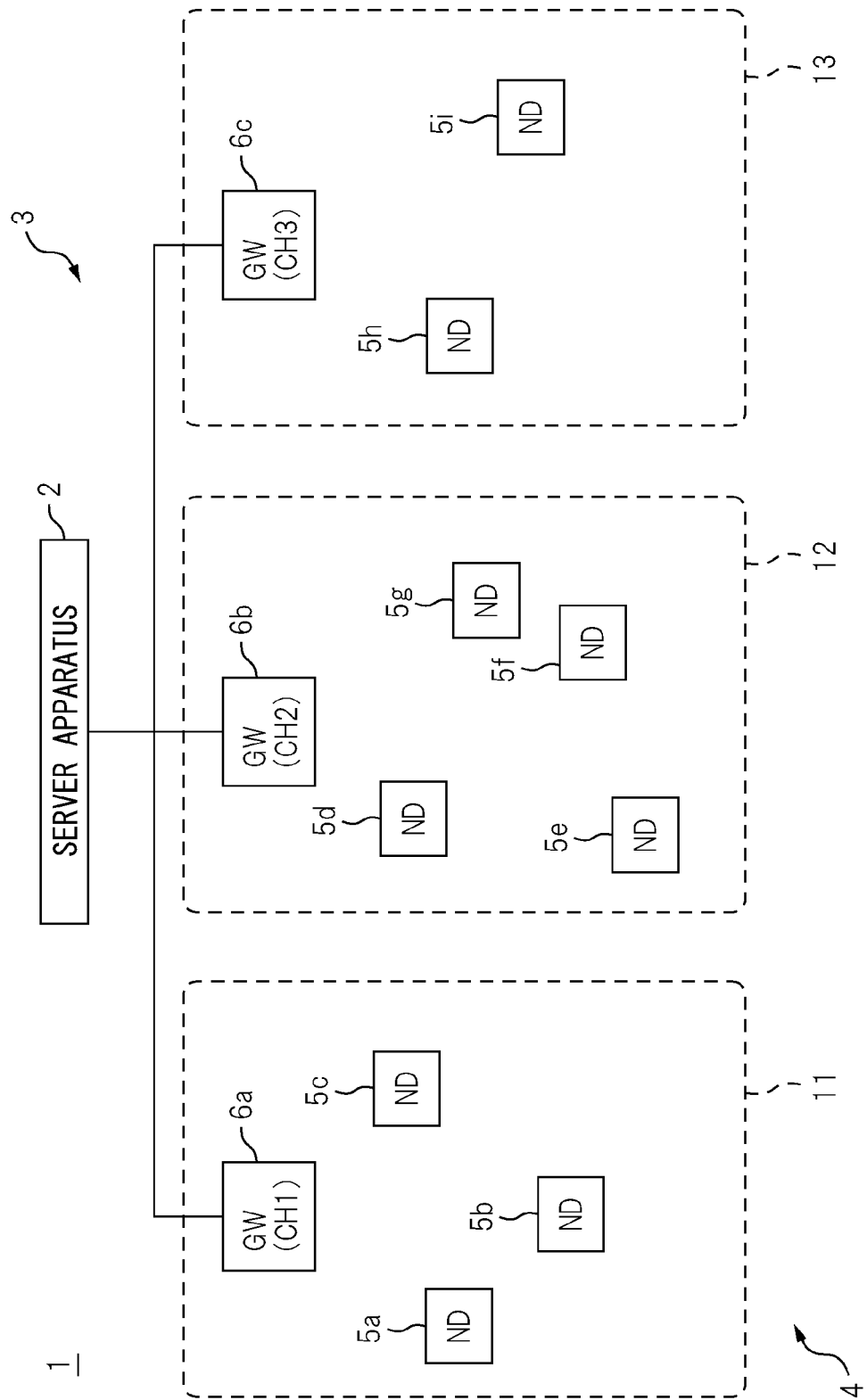

FIG.6

| CHANNEL | NODE IDENTIFIER | RECEPTION QUALITY (dBm) | RECEPTION RATIO OF REGULAR PACKET |
|---|---|---|---|
| CH1 | 1 | −65 | 100% |
| CH1 | 25 | −85 | 75% |
| ⋮ | ⋮ | ⋮ | ⋮ |
| CH1 | 109 | −70 | 90% |
| CH2 | 46 | −69 | 98% |
| ⋮ | ⋮ | ⋮ | ⋮ |

| CHANNEL | HOP COUNT |
|---|---|
| CH1 | 3 |
| CH2 | 2 |
| ⋮ | ⋮ |

| CHANNEL | NODE IDENTIFIER | RECEPTION QUALITY (dBm) | RECEPTION RATIO OF REGULAR PACKET | HOP COUNT |
|---|---|---|---|---|
| CH1 | 1 | −65 | 100% | 4 |
| CH1 | 25 | −85 | 75% | 3 |
| ⋮ | ⋮ | ⋮ | ⋮ | ⋮ |
| CH1 | 109 | −70 | 90% | 5 |
| CH2 | 46 | −69 | 98% | 2 |
| ⋮ | ⋮ | ⋮ | ⋮ | ⋮ |

NODE APPARATUS, COMMUNICATION SYSTEM, AND CHANNEL SELECTION METHOD

CROSS-REFERENCE TO RELATED APPLICATIONS

This application is based upon and claims the benefit of priority of the prior Japanese Patent Application No. 2011-123708, filed on Jun. 1, 2011, the entire contents of which are incorporated herein by reference.

FIELD

The embodiments described in the present specification relate to a wireless ad-hoc network.

BACKGROUND

A communication system that relays a wireless ad-hoc network to another network via a gateway apparatus is known. As a technology relating to such communication system, a wireless system is known, for example, which comprises a group of wireless terminals connected to a network, a first collector that communicates with the wireless terminals in a prescribed radio frequency band and functions as relaying means to a center, and a second collector that communicate with the wireless terminals in a radio frequency band different from the aforementioned radio frequency band and functions as relaying means to the center. In this system, the wireless terminals communicating with the first collector and the wireless terminals communicating with the second collector carry out, beforehand, participation into a network where a different radio frequency band is used for communication with each other in order to prepare against failure in the first or the second collector.

As another related technology, a communication method is known which includes a first retrieval process for retrieving a counter communication apparatus on a predetermined communication channel, a second retrieval process for retrieving a counter communication apparatus on all the communicable communication channels, and a retrieval control process for using the first retrieval process and the second retrieval process to retrieve a counter communication apparatus.

Also, a node is known which includes a radio interface for transmitting and receiving data through radio communication, a channel information acquisition section for acquiring information about peripheral radio interfaces as channel information by means of the radio interface, and a communication connection control section which, when a radio interface of the same system permitting configuration of a network with the radio interface is detected from among the acquired channel information, changes the configuration of the radio interface and connects the radio interface with the radio interface of the same system. The node determines whether or not the radio interface is to be connected taking into account the reception signal intensity of the radio interface.

Also, a radio communication network system is known which includes a plurality of sensor nodes, a base station to which the sensor nodes are each connected through or not through a repeater, and radio communication means used for communication carried out within a network including the sensor nodes, repeaters, and the base station. The radio communication means include a plurality of selectable carrier frequency channels, and include channel determination means for determining a carrier frequency channel suitable for communication within the communication network based on information on a connection path between a sensor node and the base station.

Also, a wireless network system is known which a plurality of base stations and wireless terminals is configured. A wireless terminal acting as a base station or a master station transmits communication control information for controlling a communication method for each slave station. A communication control part in each wireless terminal performs communication with its own master station and slave station by a communication method following the communication control information received from the master station, and at the same time, a communication quality measurement part measures the communication quality of a communication route. The base station evaluates the communication quality of each communication route based on the communication qualities collected from a communication quality tabulation part in each wireless terminal to select an optimum communication route to be used for each wireless terminal.

Related art is disclosed in Japanese Laid-open Patent Publications No. 2010-187316, No. 2010-93448, No. 2009-206999, No. 2009-200583, and No. 2010-35068.

SUMMARY

In accordance with an aspect of the apparatus, there is provided a node apparatus for forming a wireless ad-hoc network. The node apparatus includes a recognition possibility determination unit that determines whether or not a gateway apparatus connecting the wireless ad-hoc network to other networks can be recognized, an adjoining node detection unit that detects other node apparatus which is the source of received packets as an adjoining node, a channel switching unit that switches the channel used for reception of packets transmitted in the wireless ad-hoc network successively to each of a plurality of channels, and a channel selection unit that selects a channel to be used for communication in the wireless ad-hoc network from among a plurality of channels based on the number of adjoining nodes detected by the adjoining node detection unit in each of the plurality of channels.

In accordance with an aspect of the method, there is provided a channel selection method for selecting a channel to be used by a node apparatus in a wireless ad-hoc network. This method includes determining whether or not a node apparatus can recognize a gateway apparatus for connecting the wireless ad-hoc network to other networks, switching, if the node apparatus can not recognize a gateway apparatus, the channel used for receiving packets transmitted in the wireless ad-hoc network successively to each of a plurality of channels, detecting adjoining nodes transmitting packets to the node apparatus in each of the plurality of channels, and selecting a channel to be used for communication in the wireless ad-hoc network from among the plurality of channels based on the number of adjoining nodes detected in each of the plurality of channels.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 1 is a view depicting an exemplary overall construction of a communication system;

FIG. 6 is a view depicting a first example of adjoining node information;

FIG. 9 is a view depicting an example of hop count information;

FIG. 22 is a view depicting a second example of adjoining node information.

DESCRIPTION OF EMBODIMENTS

Figure 2A:
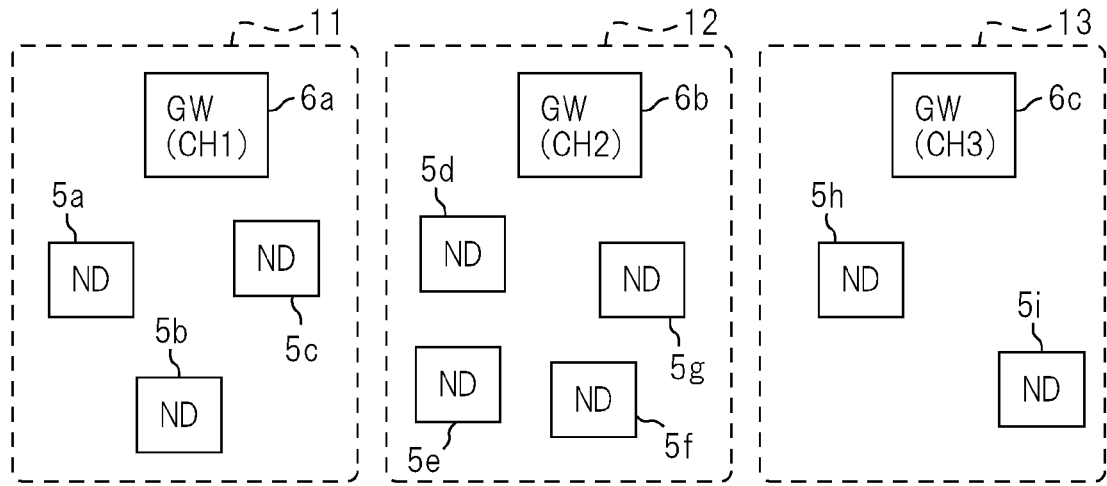
FIG. 2A is view useful for illustrating an example of implementing channel retrieval.

A case is considered as follows in which a plurality of gateway apparatuses are used for relaying a wireless ad-hoc network to other networks, with the plurality of gateway apparatuses communicating in different frequency channels with the wireless ad-hoc network. A frequency channel may be denoted hereinafter simply as "channel".

In this case, a plurality of node apparatuses constituting the wireless ad-hoc network are divided into plural groups each connected to a gateway apparatus using a frequency channel different from others. Each node apparatus belongs to one of the plural groups having a route to a gateway, and transmits and receives packets in the frequency channel used by the group.

In the communication system as described above, changes of condition may sometimes occur, such as, for example, failure of a gateway apparatus, change of the channel used, movement of a node apparatus, and the like. Due to changes of condition in the wireless ad-hoc network, a node apparatus may happen to lose a route for transmitting and receiving packets to and from the gateway apparatus and become unable to recognize a gateway apparatus.

In this case, the node apparatus can switch the channel being used and change the group it belongs in order to recognize a gateway apparatus again. At the time of switching the channel being used, it is desirable to select a channel which has higher possibility of establishing a more stable route to a gateway apparatus.

It is an object of the apparatus and method disclosed in this specification to allow a node apparatus in a wireless ad-hoc network connected to other network by a plurality of gateway apparatuses using different channels, to select a channel that permits more stable route to a gateway apparatus to be established.

<1. Construction of Communication System>

Preferred embodiments of the present invention will be illustrated with reference to appended drawings. FIG. 1 is a view depicting an exemplary overall construction of a communication system. The communication system 1 comprises a server apparatus 2, a wireless ad-hoc network 4, and gateway apparatuses 6a-6c. The wireless ad-hoc network 4 is composed of a plurality of node apparatuses 5a~5i.

In appended drawings, a gateway apparatus may be denoted as "GW", and a node apparatus may be denoted as "ND". In the description that follows, the gateway apparatuses 6a~6c may be denoted collectively as "gateway apparatus 6". Also, the node apparatuses 5a~5i may be denoted collectively as "node apparatus 5".

The communication system 1 may be, for example, a data collection system in which meter-reading data obtained by the node apparatus 5 on consumption of electric power, gas, water, and the like are collected via the gateway apparatus 6 by the server apparatus 2.

The server apparatus 2 and the gateway apparatus 6 are typically connected to a communication network 3, wherein the gateway apparatus 6 relays between the communication network 3 and a wireless ad-hoc network 4. The communication network 3 is a network that provides communication function between the server apparatus 2 and the gateway apparatus 6, and a network employing various protocols and communication media can be used.

The communication system 1 includes a plurality of gateway apparatuses 6a~6c. The gateway apparatuses 6a~6c respectively use different channel for communication with the wireless ad-hoc network 4. In the example illustrated in FIG. 1, the gateway apparatuses 6a, 6b, 6c respectively use channels CH1, CH2, CH3.

Since a plurality of gateway apparatuses 6a~6c using different channels perform communication in the wireless ad-hoc network 4, the node apparatuses 5a~5i constituting the wireless ad-hoc network 4 are divided into plural groups 11~13. The groups 11, 12 and 13 are groups of node apparatuses 5 connected to the communication network 3 through the gateway apparatuses 6a, 6b and 6c, respectively. In the example illustrated in FIG. 1, the node apparatuses 5a~5c form the group 11, the node apparatuses 5d~5g form the group 12, and the node apparatuses 5h~5i form the group 13.

The node apparatuses 5a~5c forming the group 11 use the channel CH1 to transmit packets. Each of the node apparatuses 5a~5c relays packets transmitted and received by other node apparatuses in the group 11 and the gateway apparatus 6a to thereby form an ad-hoc network including the node apparatuses 5*a*~5*c* and the gateway apparatus 6*a*. Other groups 12, 13 are formed in the same manner.

As described above, due to change of condition of the wireless ad-hoc network 4, a node apparatus 5 may become unable to recognize a gateway apparatus 6. Similarly, a node apparatus 5 may become unable to recognize any one of adjoining node apparatuses. In this specification, the phrase "a node apparatus 5 can recognize a gateway apparatus 6" means that the node apparatus 5 can establish a route for transmitting a packet to the gateway apparatus 6. Similarly, the phrase "a node apparatus 5 can recognize an adjoining node apparatus" means that the node apparatus 5 can establish a route for transmitting a packet to the adjoining node apparatus.

In the description that follows, the condition in which a node apparatus 5 cannot recognize any gateway apparatus 6 or any one of adjoining node apparatuses may be denoted as "isolation". The condition in which a node apparatus 5 is in isolation may be denoted as "isolated".

Figure 2B:
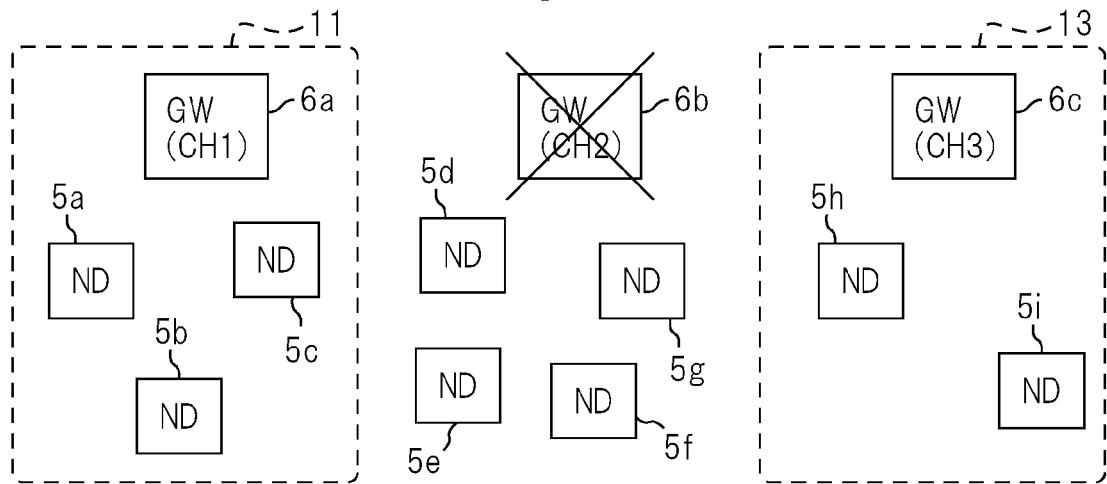
FIG. 2B is view useful for illustrating an example of implementing channel retrieval.
Figure 2C:
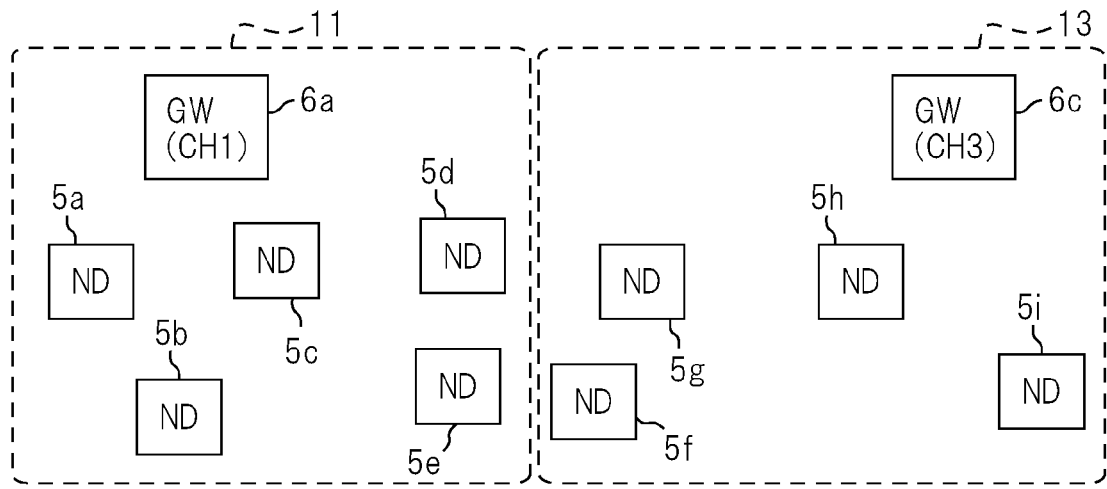
FIG. 2C is view useful for illustrating an example of implementing channel retrieval.

An isolated node apparatus 5 can retrieve channels used in the surroundings, and can switch the channel being used for communication to thereby change the group to which it belongs. In the description in this specification, the processing in which an isolated node apparatus 5 retrieves channels that can be used for communication may be denoted as "channel retrieval". FIGS. 2A, 2B, and 2C are views useful for illustrating the situation where a node apparatus 5 performs channel retrieval.

In this example, a case where a failure occurs in the gateway apparatus 6*b* in the communication system 1 is considered. FIG. 2A depicts the condition before occurrence of failure in the gateway apparatus 6*b*. Channels used by the gateway apparatus 6 and the node apparatuses 5 that belong to each of the groups 11~13 are same as in FIG. 1.

FIG. 2B depicts the condition immediately after occurrence of failure in the gateway apparatus 6*b*. The node apparatuses 5*d*~5*g* using the channel CH2 cannot communicate with the node apparatuses 5*a*-5*c* and 5*h* and 5*i* belonging to groups 11 and 13, nor with the gateway apparatuses 6*a* and 6*c*. Therefore, the node apparatuses 5*d*~5*g* are in isolated condition and cannot recognize the gateway apparatuses 6*a* and 6*c*.

The isolated node apparatuses 5*d*~5*g* retrieve channels being used in the surroundings in good communication condition. The apparatuses 5*d*~5*g* switch the channel being used to the detected channel and thereby change the group to which they belong.

FIG. 2C depicts the condition after switching the channel being used. The node apparatuses 5*d* and 5*e* select the channel CH1 to thereby belong to the network of the group 11. The node apparatuses 5*g* and 5*f* select the channel CH3 to thereby belong to the network of the group 13.

<2. First Embodiment>

Figure 3:
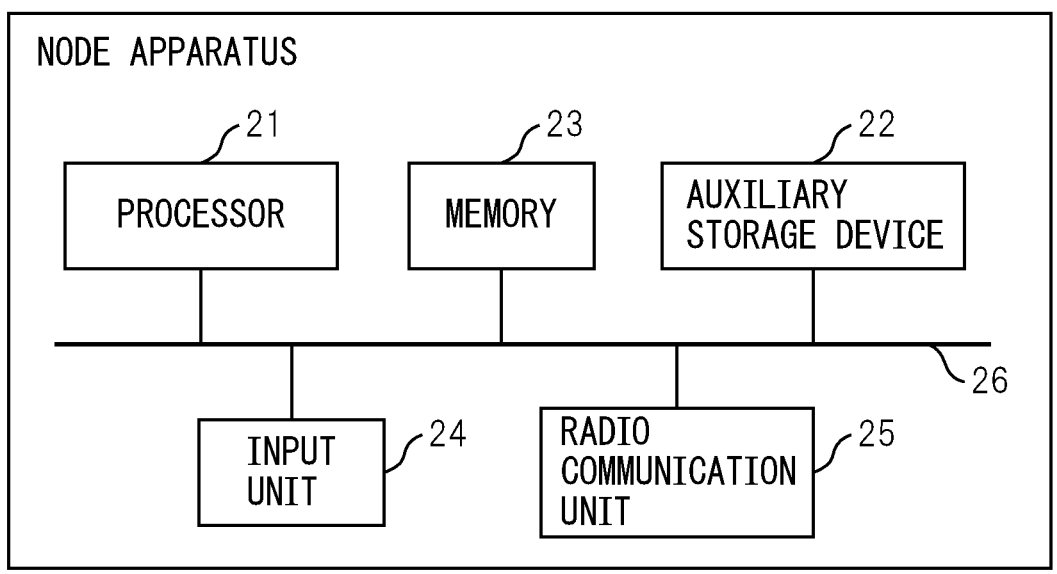
FIG. 3 is a view depicting an example of the hardware construction of a node apparatus.

Next, the construction and function of the node apparatus in each embodiment will be described below. FIG. 3 is a view depicting an example of the hardware construction of a node apparatus 5. The node apparatus 5 includes a processor 21, an auxiliary storage device 22, a memory 23, an input unit 24, a radio communication unit 25 and a data bus 26.

The processor 21 executes a control program stored in the auxiliary storage device 22 to thereby carry out various processing for controlling the operation of the node apparatus 5, and following processing for channel retrieval by the node apparatus 5. The auxiliary storage device 22 stores the control program for causing the processor 21 to execute above-described processing. The auxiliary storage device 22 may include a non-volatile memory, a read-only-memory (ROM), or a hard disc as storage elements.

The memory 23 stores a program being executed by the processor 21, and data temporarily used by this program. The memory 23 may include a random-access-memory (RAM). The input unit 24 is a constituent for receiving input of information acquired by the node apparatus 5. For example, when the communication system 1 is a data collection system as described above, the input unit 24 has the function of accessing meters on electric power, gas, and water consumption, and acquiring data by reading the meter. Also, the input unit 24 may include a user interface for receiving input operation by an operator.

The radio communication unit 25 performs radio communication processing with other node apparatus 5 and the gateway apparatus 6. The radio communication unit 25 sets the channel selected by the processor 21 after channel retrieval processing as the channel to be used for radio communication. The constituents 21-25 described above are electrically connected by data bus 26.

Figure 4:
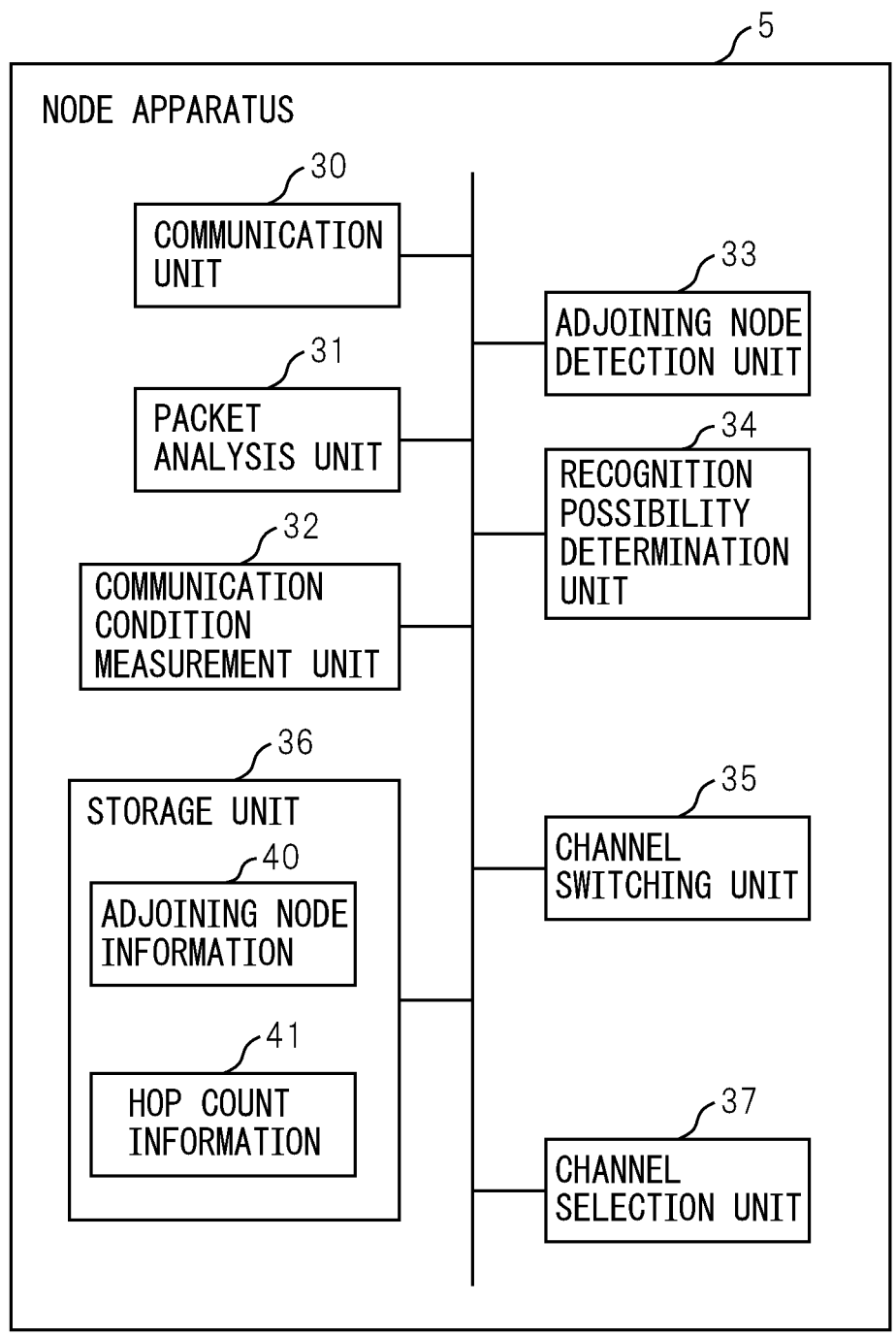
FIG. 4 is a view depicting a first example of the construction of a node apparatus.

FIG. 4 is a view depicting a first exemplary construction of a node apparatus 5. The processor 21 of FIG. 3 carries out information processing by the constituents of the node apparatus 5 depicted in FIG. 4 in accordance with the program stored in the auxiliary storage device 22 and in cooperation with other hardware constituents of the node apparatus 5 as necessary. FIG. 4 illustrates mainly the functions related to the description that follows. Thus, the node apparatus 5 may include constituents other than those depicted in FIG. 4. This applies also to other embodiments.

The node apparatus 5 includes a communication unit 30, a packet analysis unit 31, a communication condition measurement unit 32, an adjoining node detection unit 33, a recognition possibility determination unit 34, a channel switching unit 35, storage unit 36, and a channel selection unit 37.

The communication unit 30 transmits radio packets to other node apparatus 5 or a gateway apparatus 6 in unicast format or broadcast format. The communication unit 30 receives radio packets transmitted from other node apparatus 5 or a gateway apparatus 6. The channel used by the communication unit 30 for transmitting and receiving packets is set by the radio communication unit 25. The packet analysis unit 31 performs analysis of packets received and extracts information stored in the header part and message part of the packet.

The communication condition measurement unit 32 measures communication condition of a node apparatus transmitting a packet to the node apparatus 5. In the description that follows, a node apparatus transmitting packets to the node apparatus 5, that is, a node apparatus which is the source of packets received by the node apparatus 5, may be denoted as "adjoining node".

The communication condition measurement unit 32 may measure, for example, when a radio packet from an adjoining node is received, the reception quality as an index indicating communication condition. Reception quality may be, for example, Received Signal Strength Indicator (RSSI).

The communication condition measurement unit 32 may measure reception ratio of regular packets periodically transmitted from the adjoining node as an index indicating communication condition. Such regular packets may be, for example, route control packets used in specific route control protocol utilized in the wireless ad-hoc network 4. The route control packet may be, for example, Hello packet used in OLSR (Optimized Link State Routing).

Figure 5:
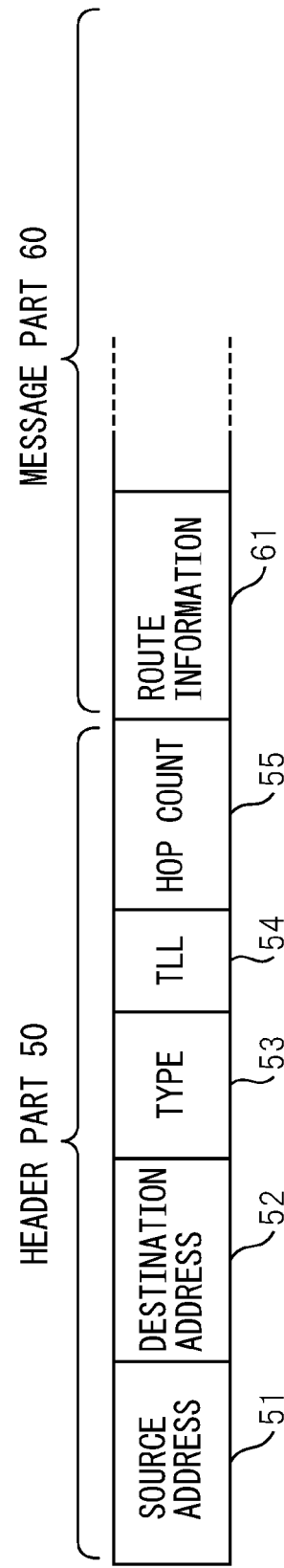
FIG. 5 is a view useful for illustrating a first example of the construction of a route control packet.

FIG. 5 is a view useful for illustrating the construction of a first example of a route control packet. The route control packet includes a header part 50 and a message part 60. The header part 50 includes the source address 51 of the packet, destination address 52, type 53, TLL (Time To Live) section 54, hop count 55 of the packet. The message part 60 includes route information used by the node apparatus 5 in preparing route table in the route control protocol.

The communication condition measurement unit 32 may calculate the reception ratio of regular packets, for example, in accordance with the following equation (1).

Reception ratio=Number of received regular packets÷ (total reception time÷transmission period of regular packets)          (1)

Referring to FIG. 4, the adjoining node detection unit 33 detects, when a packet is received from other node apparatus 5, this other node apparatus 5 which is the source of the packet as an adjoining node. When the adjoining node detection unit 33 detects an adjoining node, it stores the adjoining node information 40 on the detected adjoining node in the storage unit 36. In an embodiment, the adjoining node detection unit 33 may detect an adjoining node by receiving a route control packet described above.

FIG. 6 is a view depicting a first example of the adjoining node information 40. The adjoining node information 40 may include "channel" and "node identifier" as information elements. In an embodiment, the adjoining node information 40 may include an information element indicating the communication condition measured by the communication condition measurement unit 32 on the adjoining node. These information elements may be, for example, "reception quality" and "reception ratio of regular packets". As will be described later, in other embodiments, information element indicating communication condition may be omitted.

The information element "channel" is the identifier of the channel on which the adjoining node transmits and receives packets. The information element "node identifier" is the identifier of the adjoining node. The identifier may be, for example, a MAC address. The information elements "reception quality" and "reception ratio of regular packets" are the reception quality and the reception ratio of regular packets measured by the communication condition measurement unit 32 on the adjoining node.

In the example depicted in FIG. 6, the adjoining node with the node identifier "1" uses the channel CH1 to transmit and receive packets. This adjoining node is the adjoining node detected by the adjoining node detection unit 33 in the period in which the communication unit 30 uses the channel CH1 to transmit and receive packets. Also, the adjoining node with the node identifier "46" uses the channel CH2 to transmit and receive packets. This adjoining node is the adjoining node detected in the period in which packets are transmitted and received using the channel CH2. The reception quality and the reception ratio of regular packets of the adjoining node with the node identifier "1", are "−65 dBm" and "100%", respectively. The reception quality and the reception ratio of regular packets of the adjoining node with the node identifier "46", are "−69 dBm" and "98%", respectively.

Referring to FIG. 4, the recognition possibility determination unit 34 determines whether or not the node apparatus 5 can recognize any gateway apparatus 6. In other words, the recognition possibility determination unit 34 determines whether or not a route for transmitting packets can be established between the node apparatus 5 and some gateway apparatus 6, that is, whether or not the node apparatus 5 is isolated.

In an example, the recognition possibility determination unit 34 determines that a gateway apparatus 6 can be recognized when a flooding packet transmitted from a gateway apparatus 6 to the wireless ad-hoc network 4 is received. The flooding packet may be a packet regularly transmitted from the gateway apparatus 6. In an embodiment, the flooding packet may be, for example, Router Advertisement packet used in IPv6 (Internet Protocol Version 6). In another embodiment, the flooding packet may be, for example, control packet notifying dead/alive state of a gateway apparatus 6 in a specific route control protocol.

Figure 7:
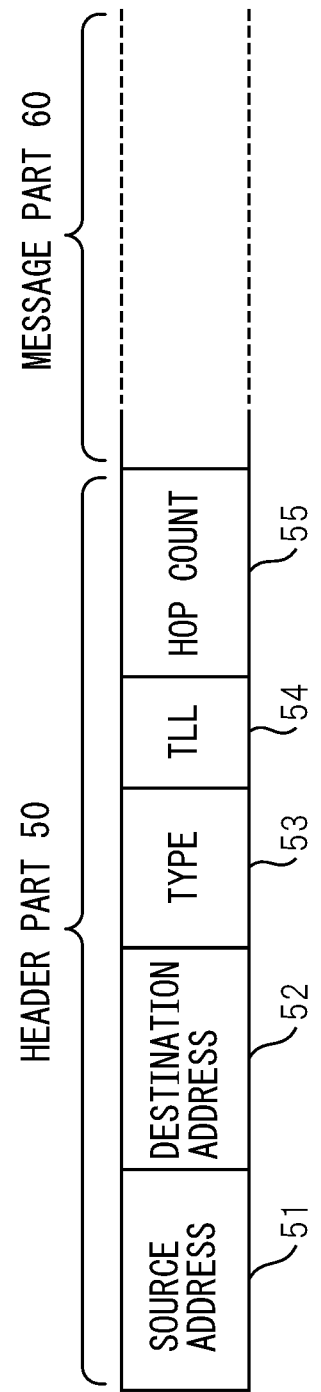
FIG. 7 is a view useful for illustrating an example of the construction of flooding packets transmitted in an ad-hoc network.

FIG. 7 is a view useful for illustrating an example of the construction of a flooding packet transmitted in an ad-hoc network. The header part 50 of the flooding packet is same as the header part 50 of a route control packet illustrated with reference to FIG. 5. Type 53 indicates the type of the packet. Value of type 53 indicates that the packet is a flooding packet. Hop count 55 stores the number of hops from the gateway apparatus 6 that is the source of the packet. In the message part 60, information transmitted to the node apparatus 5 in broadcast format is stored.

Figure 8:
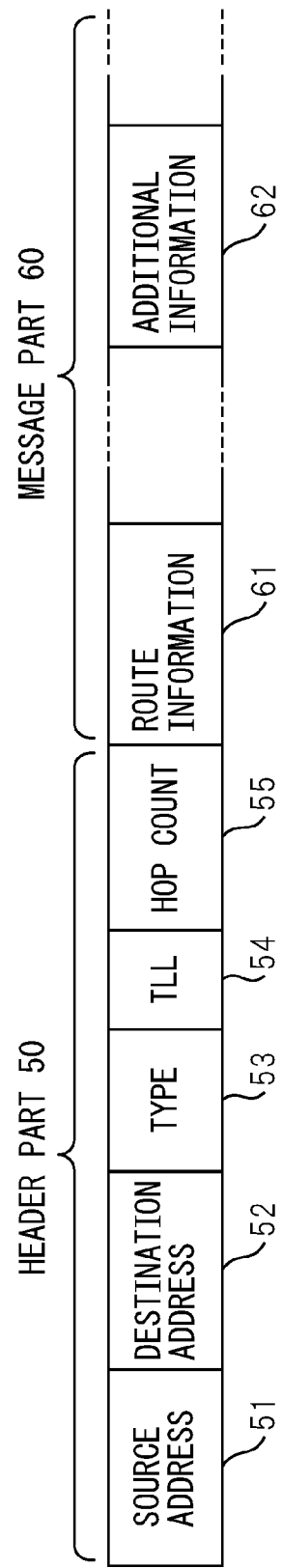
FIG. 8 is a view useful for illustrating a second example of the construction of a route control packet.

In an embodiment, the recognition possibility determination unit 34 may determine the possibility of recognizing gateway apparatus 6 based on route control packets received from adjoining nodes. FIG. 8 is a view useful for illustrating the construction of a second example of a route control packet. The node apparatus 5 in this example stores hop count between the node apparatus 5 and the gateway apparatus 6 in storage unit 36. When the node apparatus 5 transmits the route control packet, it stores the hop count to the gateway apparatus 6 as additional information in the message part 60. The recognition possibility determination unit 34 determines, when receiving the route control packet, the possibility of recognizing gateway apparatus 6 according to whether or not the additional information is stored in the message part 60.

Referring to FIG. 4, when the recognition possibility determination unit 34 determines that no gateway apparatus can be recognized, that is, that all the routes to gateway apparatuses 6 are lost and the node apparatus 5 is isolated, the channel switching unit 35 successively switches the channel used by the communication unit 30 to receive packets. At this time, the channel switching unit 35 switches the channel used by the node apparatus 5 for receiving packets all over the N channels CH1~CHN provided for communication in the wireless ad-hoc network 4.

During the channel switching processing by the channel switching unit 35, the recognition possibility determination unit 34 detects in each channel the hop count to a recognizable gateway apparatus 6. In the present embodiment, the recognition possibility determination unit 34 acquires the hop count to a gateway apparatus 6 from the hop count 55 in the flooding packet transmitted from the gateway apparatus 6 during the channel switching processing.

Figure 9:
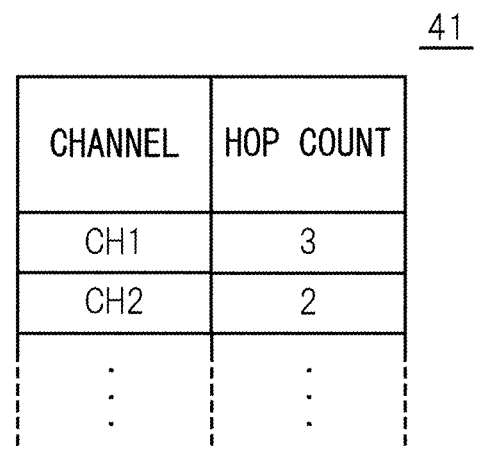

FIG. 9 is a view depicting an example of the hop count information 41. The hop count information 41 may include information elements "channel" and "hop count". The information element "channel" is an identifier of the channel on which the gateway apparatus 6 was recognized. The information element "hop count" is the hop count to the recognized gateway apparatus. In the example depicted in FIG. 8, the hop count to the gateway apparatus 6 recognized on the channel "CH1" is "3", and the hop count to the gateway apparatus 6 recognized on the channel "CH2" is "2".

For the gateway apparatus 6 having the hop count stored in the hop count information 41, the hop count from the node apparatus 5 can be specified. Thus, the hop count information 41 indicates the gateway apparatus 6 that can be recognized by the node apparatus in each channel.

During the channel switching processing by the channel switching unit 35, the adjoining nodes detection unit 33 detects adjoining nodes in each channel. When the channel switching processing performed by the channel switching unit 35 has been finished, the channel selection unit 37 selects a channel to be used for communication in the wireless ad-hoc network 4 from among a plurality of channels CH1~CHN based on the number of adjoining nodes detected in each channel.

Examples of the channel selection processing by the channel selection unit 37 will be described below.

<2-1. First Example of Channel Selection Processing>

(Processing 1-1) The channel selection unit 37 specifies, by referring to the adjoining node information 40, the number of adjoining nodes satisfying a prescribed communication condition from among the adjoining nodes detected in each channel. For example, the channel selection unit 37 specifies the number of adjoining nodes with the reception signal intensity and the reception ratio of regular packet not lower than prescribed thresholds as the number of adjoining nodes satisfying the prescribed communication condition. In other embodiment, the channel selection unit 37 may specify the number of all the adjoining nodes detected in each channel as the number of adjoining nodes. In this case, the information element indicating communication condition may be omitted from the adjoining node information 40.

(Processing 1-2) The channel selection unit 37, by referring to the hop information 41, determines whether or not a gateway apparatus 6 can be recognized in each channel. The channel selection unit 37 specifies these channels in which a node apparatus 5 can recognize a gateway apparatus 6. In an embodiment, the channel selection unit 37 may specify only those channels in which the hop count to a gateway apparatus 6 is shorter than a prescribed hop count. In an embodiment, the prescribed hop count may be the restricted hop count determined by the route control protocol.

(Processing 1-3) The channel selection unit 37, by referring to the hop information 41, evaluates the hop count to a gateway apparatus 6 in the channels specified in (Processing 1-2). If there is only one channel in which the hop count to a gateway apparatus 6 is minimum, the channel selection unit 37 selects this channel as the channel to be used for communication.

(Processing 1-4) If there are plural channels in which the hop count to a gateway apparatus 6 is minimum, the channel selection unit 37 selects a channel to be used for communication from among these channels based on the number of adjoining nodes specified in (Processing 1-1). An example of the method for selecting a channel based on the number of adjoining nodes will be described later.

(Processing 1-5) If there is no channel specified in (Processing 1-2), the channel selection unit 37 selects a channel to be used for communication from all channels based on the number of adjoining nodes specified in (Processing 1-1).

<2-2. Second Example of Channel Selection Processing>

(Processing 2-1) The channel selection unit 37 specifies the number of adjoining nodes as in (Processing 1-1).

(Processing 2-2) The channel selection unit 37 specifies the channels as in (Processing 1-2).

(Processing 2-3) The channel selection unit 37 determines, for all the channels specified in (Processing 2-2), whether or not the number of adjoining nodes specified in (Processing 2-1) exceeds a prescribed threshold M. If the number of adjoining nodes exceeds the prescribed threshold M, the channel selection unit 37 selects the channel in which the hop count to a gateway apparatus 6 is minimum as the channel to be used for communication.

(Processing 2-4) If, in all channels specified in (Processing 2-2), the number of adjoining nodes specified in (Processing 2-1) does not exceed the prescribed threshold M, the channel selection unit 37 selects a channel to be used for communication as follows.

If, among the channels specified in (Processing 2-2), there is only one channel for which the number of adjoining nodes specified in (Processing 2-1) is maximum, this channel is selected as the channel to be used for communication.

(Processing 2-5) If, among the channels specified in (Processing 2-2), there are plural channels for which the number of adjoining nodes specified in (Processing 2-1) is maximum, a channel in which the hop count to the gateway apparatus 6 is minimum is selected from among these channels as the channel to be used for communication.

(Processing 2-6) On the other hand, if there is no channel specified in (Processing 2-2), the channel selection unit 37 selects a channel to be used for communication from all channels based on the number of adjoining nodes specified in (Processing 2-1).

Figure 10:
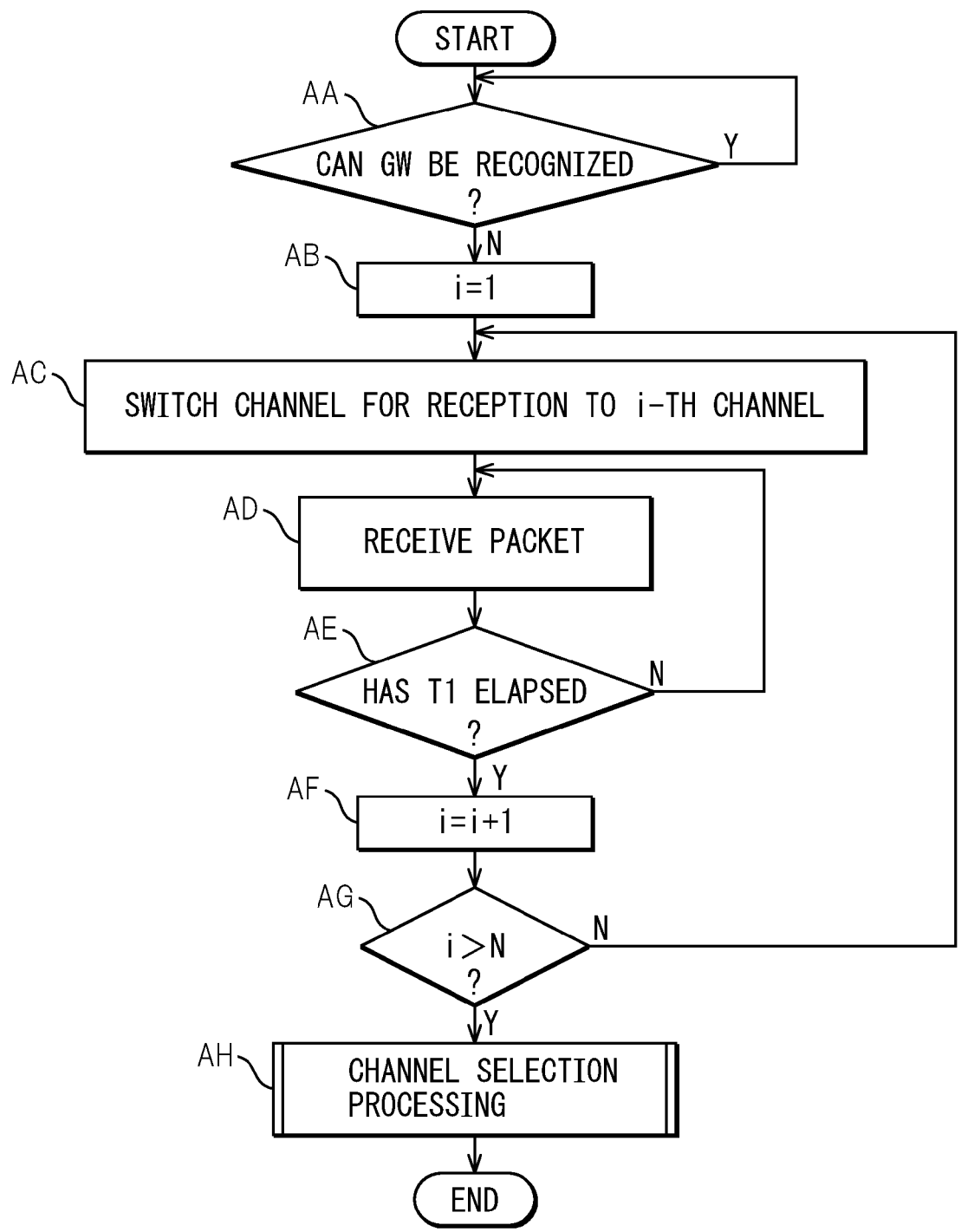
FIG. 10 is a view useful for illustrating a first example of the processing of a node apparatus.

Next, the channel retrieval processing of the node apparatus 5 according to the present embodiment will be described. FIG. 10 is a view useful for illustrating a first example of the processing of the node apparatus 5. In other embodiments, the following operations AA~AH may be steps.

In operation AA, the recognition possibility determination unit 34 determines whether or not a gateway apparatus 6 can be recognized in the channel being used for communication by the node apparatus 5 at present, i.e., whether or not the node apparatus 5 is isolated. If a gateway apparatus 6 can be recognized (operation AA: Y), the recognition possibility determination unit 34 repeats operation AA. If a gateway apparatus 6 cannot be recognized (operation AA: N), the processing proceeds to operation AB.

In operation AB, value of the variable i for selecting channels CH1~CHN successively is initialized to "1". In operation AC, the channel switching unit 35 switches the channel used by the communication unit 30 for reception of packets to CHi.

In operation AD, the communication unit 30 receives packets transmitted from adjoining nodes or a gateway apparatus 6. When a packet is received from an adjoining node, the adjoining node detection unit 33 stores the adjoining node information about the adjoining node that is the source of the packet in the storage unit 36. When a flooding packet is received from a gateway apparatus 6, the recognition possibility determination unit 34 stores the hop count information 41 on the gateway apparatus 6 of the source of the flooding packet in the storage unit 36.

In operation AE, the channel switching unit 35 determines whether or not a prescribed channel switching period T1 has elapsed. If the prescribed channel switching period T1 has not elapsed (operation AE: N), the processing returns to operation AD. If the prescribed channel switching period T1 has elapsed (operation AE: Y), the processing proceeds to operation AF.

In operation AF, value of the variable i is increased by one. In operation AG, it is determined whether or not value of the variable i exceeds the number N of channels CH1~CHN provided for transmission and reception of packets. If the value of the variable i does not exceed the number of channels (operation AG: N), the processing returns to operation AC. If the value of the variable i exceeds the number of channels (operation AG: Y), the processing proceeds to operation AH.

In operation AH, the channel selection unit 37 selects a channel to be used for communication in the wireless ad-hoc network 4 in accordance with the selection processing such as the processing (1-1)~(1-5) or (2-1)~(2-6) as described above. The selection processing in the channel selection unit 37 will be further described later.

Figure 11:
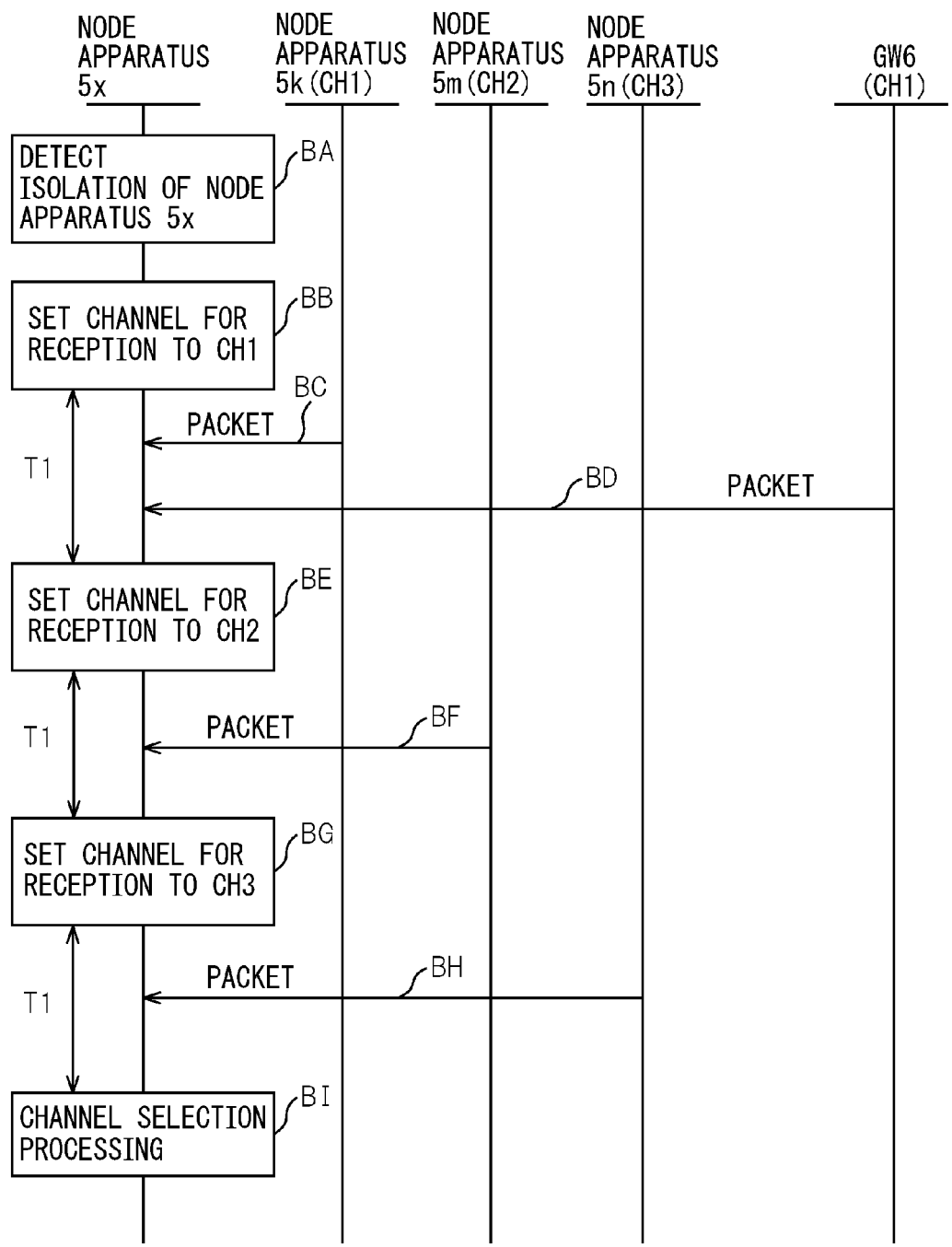
FIG. 11 is a view useful for illustrating channel switching in the processing of FIG. 10.

Next, channel switching carried out by the channel switching unit 35 in the processing depicted in FIG. 10 will be described. FIG. 11 is a view useful for illustrating channel switching carried out by the channel switching unit 35. In other embodiments, following operations BA~BI may be steps.

In FIG. 11, the node apparatus 5x represents a node apparatus 5 carrying out the processing of FIG. 10. The node apparatuses 5k~5n represent adjoining nodes using channels CH1~CH3, respectively. The gateway apparatus 6 uses the channel CH1. Although FIG. 11 depicts a case where the number of channels is N=3, the number of channels N may be integer other than 3, in other embodiments.

In operation BA, the recognition possibility determination unit 34 of the node apparatus 5x detects isolation of the node apparatus 5x. In operation BB, the channel switching unit 35 switches the channel used by the communication unit 30 for reception of packets to CH1.

During the channel switching period T1 following operation BB, the node apparatus 5x can receive packets transmitted using the channel CH1. In operation BC, the node apparatus 5x receives packets from adjoining node 5k using the channel CH1. In operation BD, the node apparatus 5x receives flooding packets from the gateway apparatus 6.

After the channel switching period has elapsed, in operation BE, the channel switching unit 35 switches the channel being used by the communication unit 30 for reception of packets to the channel CH2. During the channel switching period T1 following operation BE, the node apparatus 5x can receive packets transmitted in the channel CH2. In operation BF, the node apparatus 5x receives packets from adjoining node 5m in the channel CH2.

After channel switching period T1 has elapsed, in operation BG, the channel switching unit 35 switches the channel being used by the communication unit 30 for receiving packets to the channel CH3. In the channel switching period T1 following operation BG, the node apparatus 5x can receive packets transmitted in the channel CH3. In operation BH, the node apparatus 5x receives packets from adjoining node 5n using the channel CH3.

In operations BB~BH described above, the node apparatus 5x receives packets from adjoining nodes and flooding packets from the gateway apparatus 6 in all the channels CH1~CH3 that can be used. In operation BI, the channel selection unit 37 selects the channel to be used for communication in the wireless ad-hoc network 4. The processing in operation BI is the same as the channel selection processing carried out in operation AH of FIG. 10.

Figure 12:
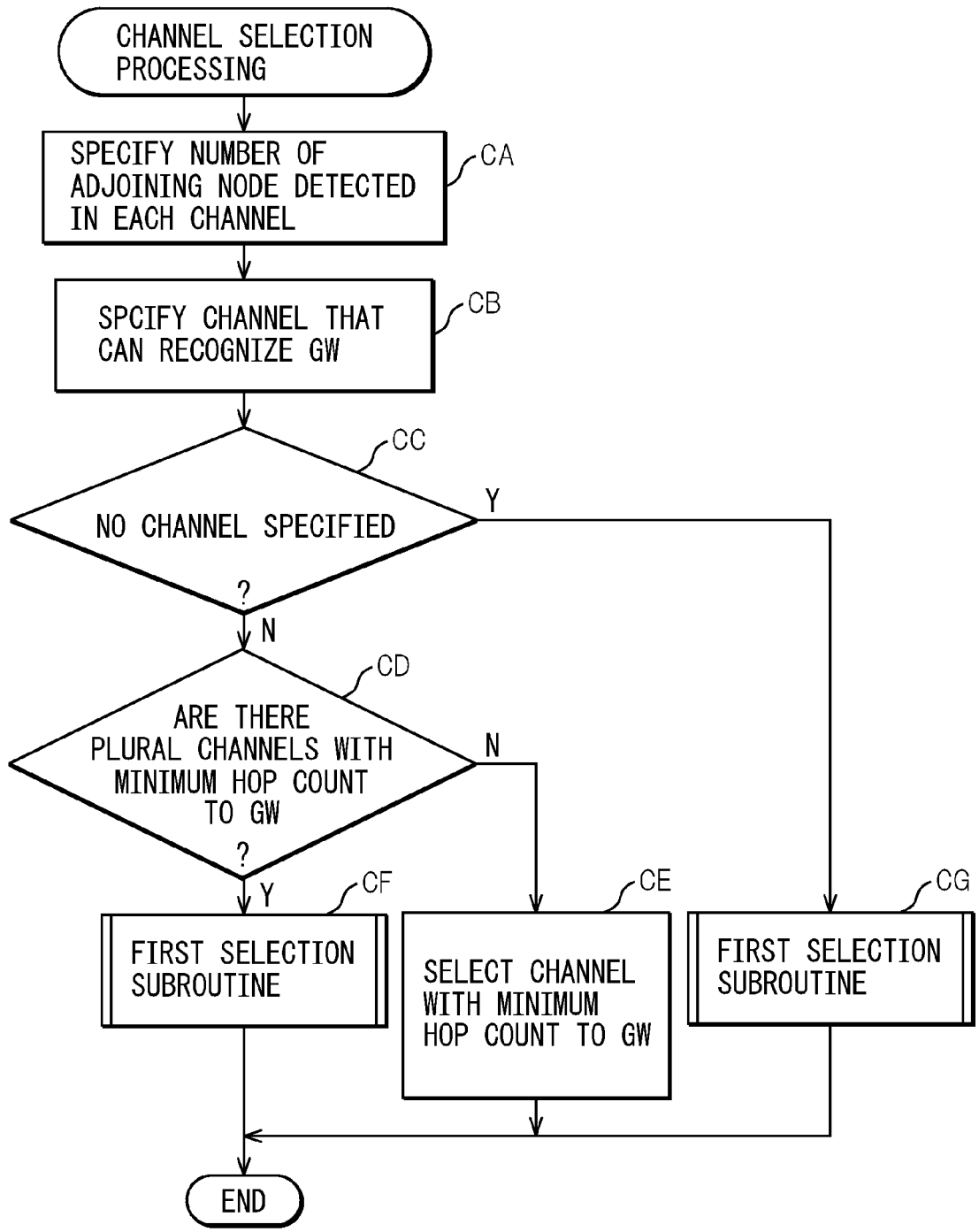
FIG. 12 is a view useful for illustrating a first example of the channel selection processing.
Figure 13:
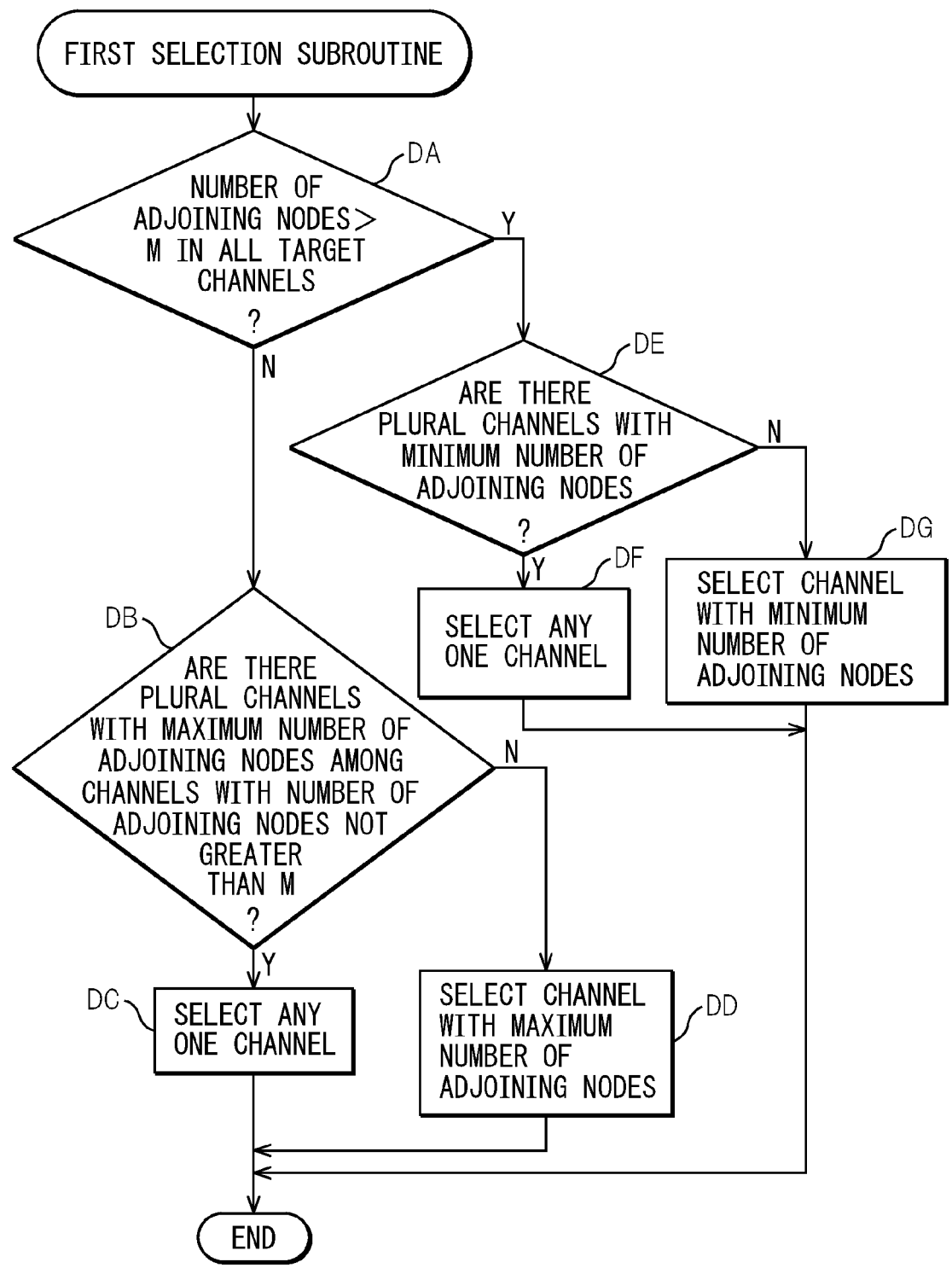
FIG. 13 is a view useful for illustrating the processing in a subroutine of FIG. 11.

Next, channel selection processing carried out in operation AH of FIG. 10 will be described. FIG. 12 and FIG. 13 are views useful for illustrating a first example of the channel selection processing. The channel selection processing illustrated in FIG. 12 and FIG. 13 corresponds to <2-1. First example of channel selection processing> described above. In other embodiments, following operations CA~CG and operations DA~DG may be steps.

In operation CA, the channel selection unit 37 specifies, by referring to the adjoining node information 40, the number of adjoining nodes satisfying a prescribed communication condition from among the adjoining nodes detected in each channel. In operation CB, the channel selection unit 37 specifies channels in which a node apparatus 5 can recognize a gateway apparatus 6. In an embodiment, the channel selection unit 37 may specify only those channels with hop count to the gateway apparatus 6 shorter than a prescribed hop count.

In operation CC, the channel selection unit 37 determines whether or not there is at least one channel specified in operation CB. If there is no channel specified (operation CC: Y), the processing proceeds to operation CG. If there is at least one channel specified (operation CC: N), the processing proceeds to operation CD.

In operation CD, the channel selection unit 37 determines whether or not there are plural channels in which hop count to a gateway apparatus 6 is minimum and same among the channels specified in operation CB. If there are plural channels (operation CD: Y), the processing proceeds to operation CF. If there are not plural channels (operation CD: N), the processing proceeds to operation CE.

In operation CE, the channel selection unit 37 selects the channel with minimum hop count to the gateway apparatus 6 as the channel to be used for communication.

In operation CF, the channel selection unit 37 selects the channel to be used for communication from among the plural channels in which hop count to the gateway apparatus 6 is minimum and same in accordance with the first selection subroutine illustrated in FIG. 13.

In the description of FIG. 13, the set of mother population channels from which the channel to be used for communication is selected in accordance with the first selection subroutine is denoted as "target channels". For example, when the first selection subroutine is executed in operation CF, the channels in which hop count to the gateway apparatus 6 is minimum and same among the channels specified in operation CB are target channels.

In operation DA, the channel selection unit 37 determines, for all the target channels, whether or not the number of adjoining nodes specified in operation CA exceeds a prescribed threshold M. If the number of adjoining nodes does not exceed the prescribed threshold M (operation DA: N), the processing proceeds to operation DB. If the number of adjoining nodes exceeds the prescribed threshold M (operation DA: Y), the processing proceeds to operation DE.

In operation DB, the channel selection unit 37 determines whether or not there are plural channels in which the number of adjoining nodes specified in operation CA is maximum and same among the target channels with the number of adjoining nodes not greater than the threshold M. If there are plural channels in which the number of adjoining nodes is maximum and same (operation DB: Y), the processing proceeds to operation DC. If there is only one channel in which the number of adjoining nodes is maximum and same (operation DB: N), the processing proceeds to operation DD.

In operation DC, the channel selection unit 37 selects any one channel from among the target channels with maximum and same number of adjoining nodes as the channel to be used for communication. For example, the channel selection unit 37 may select the channel with the least channel identification number. In operation DD, the channel selection unit 37 selects the channel with maximum number of adjoining nodes as the channel to be used for communication.

On the other hand, in operation DE, the channel selection unit 37 determines whether or not there are plural target channels in which the number of adjoining nodes specified in operation CA is minimum and same. If there are plural target channels with minimum and same number of adjoining nodes (operation DE: Y), the processing proceeds to operation DF. If there is only one target channel with minimum number of adjoining nodes (operation DE: N), the processing proceeds to operation DG.

In operation DF, the channel selection unit 37 selects any one channel from among the channels with minimum and same number of adjoining nodes specified in operation CA, as the channel to be used for communication. For example, the channel selection unit 37 may select the channel with the least channel identification number. In operation DG, the channel selection unit 37 selects the channel with minimum number of adjoining nodes as the channel to be used for communication.

In accordance with the first selection subroutine, a channel in which the number of adjoining nodes specified in operation CA is as close to threshold M as possible is selected. Thus, possibility of selecting a channel which has too small number of adjoining nodes and which has unstable route to the gateway apparatus 6 can be reduced. Also, possibility of selecting a congested channel which has too large number of adjoining nodes can be reduced.

Referring to FIG. 12, in operation CG, the channel selection unit 37 selects a channel to be used for communication from all the channels CH1~CHN in accordance with the first selection subroutine as illustrated in FIG. 13. In operation CG, when the first selection subroutine is executed, all channels are target channels of the first selection subroutine.

In operation CG, even if there is no channel in which the node apparatus 5 can recognize the gateway apparatus 6, a channel in which the number of adjoining nodes is as close to threshold M as possible is selected. Thus, when a gateway apparatus turns out to be recognizable as a result of change of network condition, the route to the gateway apparatus 6 can be expected to be a stable route.

Figure 14:
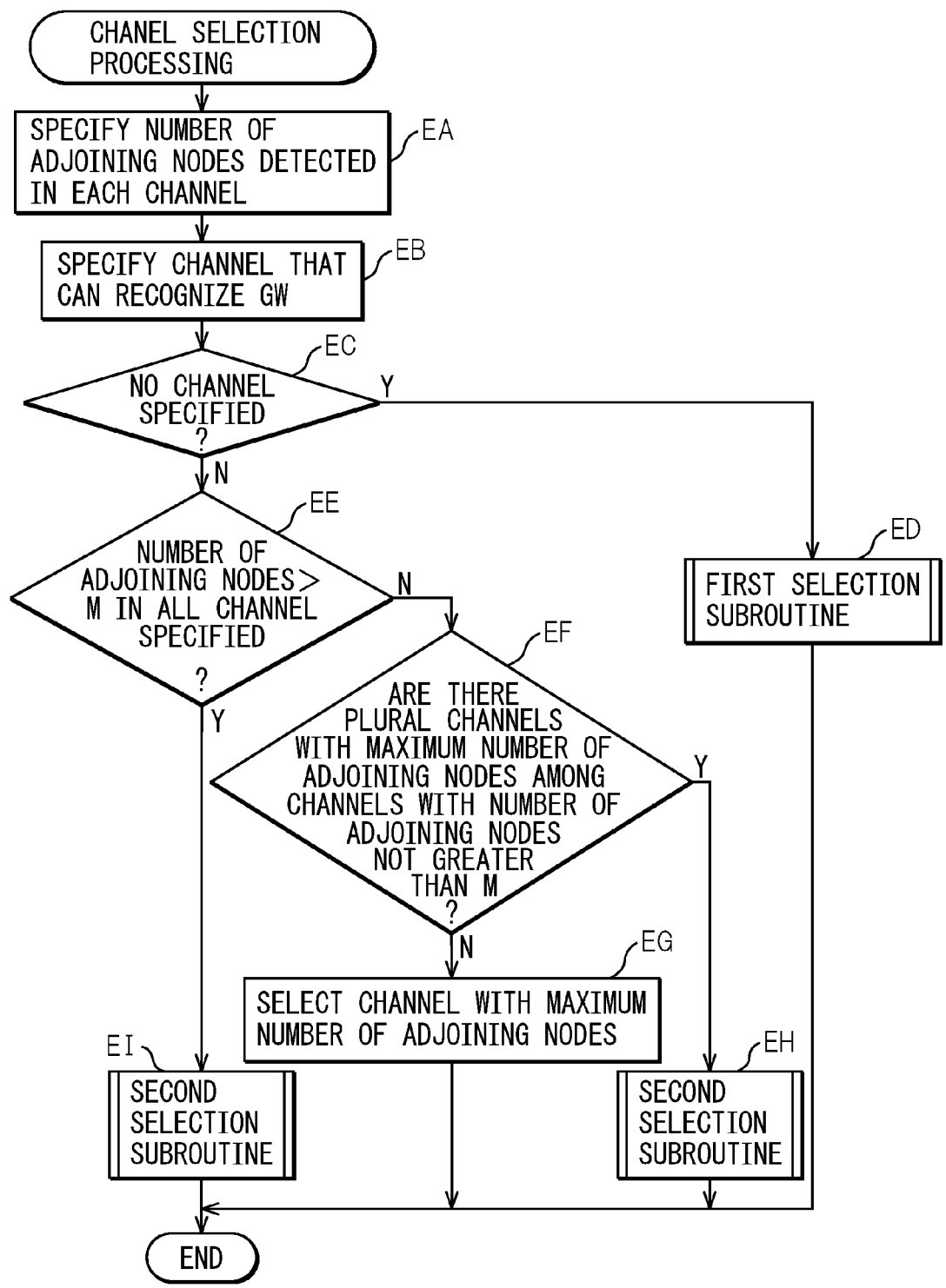
FIG. 14 is a view useful for illustrating a third example of the channel selection processing.
Figure 15:
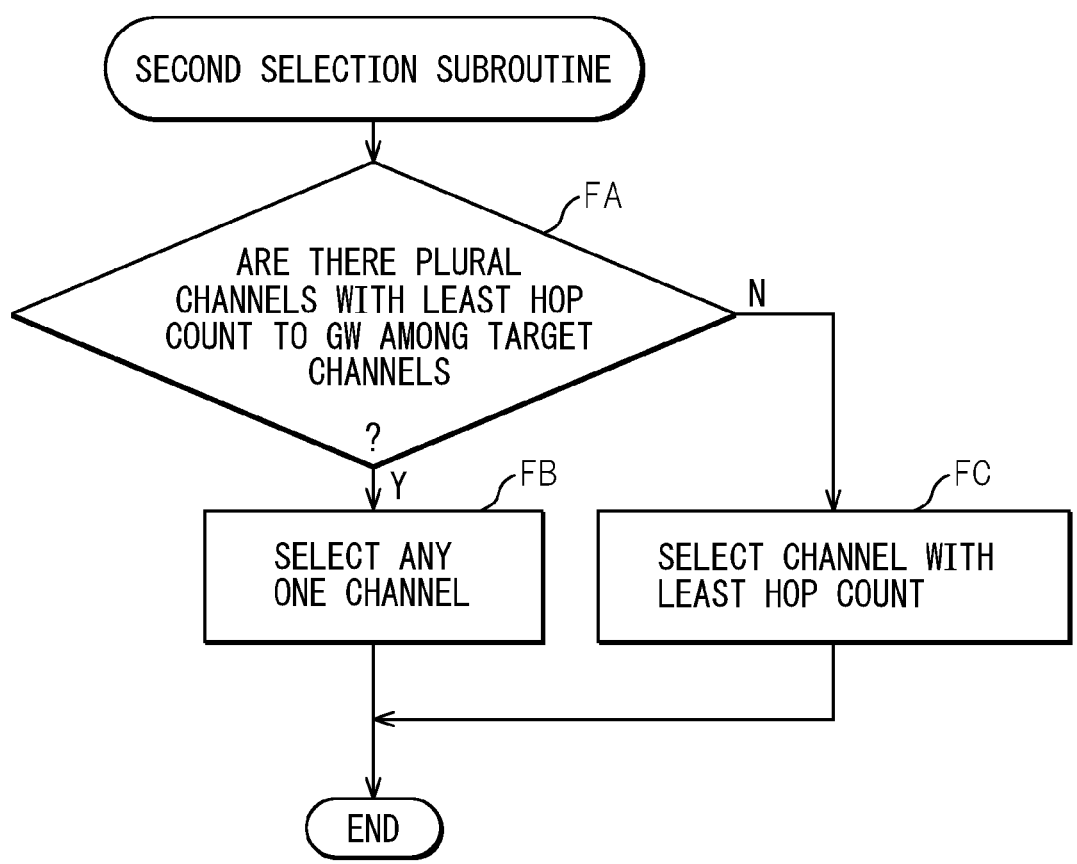
FIG. 15 is a view useful for illustrating the processing in a subroutine of FIG. 14.

Next, other channel selection processing executed in operation AH will be described. FIG. 14 and FIG. 15 are views useful for illustrating a second example of channel selection processing. The channel selection processing as illustrated in FIG. 14 and FIG. 15 corresponds to <2-2. Second example of channel selection processing> described above. In other embodiments, following operations EA~EI and operations FA~FC may be steps.

Processing in operations EA and EB is the same as in operations CA and CB of FIG. 12. In operation EC, the channel selection unit 37 determines whether or not there is at least one channel specified in operation EB. If there is no channel specified (operation EC: Y), the processing proceeds to operation ED. If there is at least one channel specified (operation EC: N), the processing proceeds to operation EE.

Processing in operation ED is same as processing in operation CG as illustrated in FIG. 12. In operation EE, the channel selection unit 37 determines, in all channels specified in operation EB, whether or not the number of adjoining nodes specified in operation EA exceeds a prescribed threshold M. If the number of adjoining nodes doe not exceed the prescribed threshold M (operation EE: N), the processing proceeds to operation EF. If the number of adjoining nodes exceeds the prescribed threshold M (operation EE: Y), the processing proceeds to operation EI.

In operation EF, the channel selection unit 37 determines whether or not there are plural channels in which the number of adjoining nodes specified in operation EA is maximum and same from among the channels specified in operation EB and with the number of adjoining nodes not greater than the threshold M. If there is only one channel in which the number of adjoining nodes is maximum (operation EF: N), the processing proceeds to operation EG. If there are plural channels with maximum and same number of adjoining nodes (operation EF: Y), the processing proceeds to operation EH.

In operation EG, the channel selection unit 37 selects the channel with maximum number of adjoining nodes as the channel to be used for communication. In operation EH, the channel selection unit 37 selects a channel to be used for communication from among the channels with maximum and same number of adjoining nodes in accordance with a second selection subroutine illustrated in FIG. 15.

In the description of FIG. 15, the set of mother population channels from which the channel to be used for communication is selected in accordance with the second selection subroutine is denoted as "target channels". For example, when the second selection subroutine is executed in operation EH, the channels in which the number of adjoining nodes specified in operation EA is maximum and same among the channels specified in operation EB are target channels.

In operation FA, the channel selection unit 37 determines whether or not there are plural channels with minimum and same hop count to the gateway apparatus 6 among the target channels. If there are plural channels with minimum and same hop count to the gateway apparatus 6 (operation FA: Y), the processing proceeds to operation FB. If there is only one channel with minimum hop count to the gateway apparatus 6 (operation FA: N), the processing proceeds to operation FC.

In operation FB, the channel selection unit 37 selects, from among the target channels, any one channel with minimum and same hop count to the gateway apparatus 6 as the channel to be used for communication. For example, the channel selection unit 37 may select the channel with the least channel identification number. In operation FC, the channel selection unit 37 selects the channel with minimum hop count as the channel to be used for communication.

Referring to FIG. 14, in operation EI, the channel selection unit 37 selects, from all the channels specified in operation EB, a channel to be used for communication in accordance with the second selection subroutine. When the second selection subroutine is executed in operation EI, all the channels specified in operation EB are target channels of the second selection subroutine.

In accordance with the present embodiment, the node apparatus 5 can carry out channel retrieval without transmitting control packets to the wireless ad-hoc network 4. Therefore, channel retrieval processing does not consume wireless resource of the wireless ad-hoc network 4.

In accordance with the present embodiment, the node apparatus 5 can select a channel in which the number of adjoining nodes detected is as close to the threshold M as possible. By setting a suitable threshold M, the node apparatus 5 can select a channel in which a more stable route to the gateway apparatus is established. In calculating the number of adjoining nodes, only those channels with a prescribed communication condition are taken into account so that a more stable channel can be selected.

Also, in accordance with the present embodiment, the node apparatus 5 can select a channel in which hop count to the gateway apparatus 6 is less. Therefore, the node apparatus 5 can select a channel which permits a stable route to the gateway apparatus to be established, and which can reduce transmission delay.

<3. Second Embodiment>

Next, another embodiment will be described. In the second embodiment, when the channel switching unit 35 switches the channel, different waiting periods are used for waiting reception of packets from an adjoining node and for waiting reception of flooding packets from the gateway apparatus 6.

In the channel switching processing by the channel switching unit 35, the channel is not switched until the period for transmission of packets from an adjoining node and the period for transmission of flooding packets from the gateway apparatus have elapsed in order to securely receive these packets. In the wireless ad-hoc network 4, the period for the gateway apparatus 6 to transmit flooding packets may be longer than the period for a node apparatus 5 to transmit packets.

However, the possibility is low that an ad-hoc network is formed to use the channel not used by a gateway apparatus 6. Therefore, if there is no packet received from an adjoining node while a channel is selected, it is likely that there is no gateway apparatus 6 using that channel.

Thus, in this embodiment, the channel switching unit 35 waits reception of packets from an adjoining node until the transmission period for regular packets by a node apparatus 5 has elapsed. If there is no reception of packets from an adjoining node until the transmission period for a node apparatus 5 has elapsed, the channel switching unit 35 switches the channel being used for reception to the next channel. If there is reception of packets from an adjoining node before the transmission period for a node apparatus 5 has elapsed, the channel switching unit 35 extends the channel switching time until the transmission period for flooding packets has elapsed.

Figure 16:
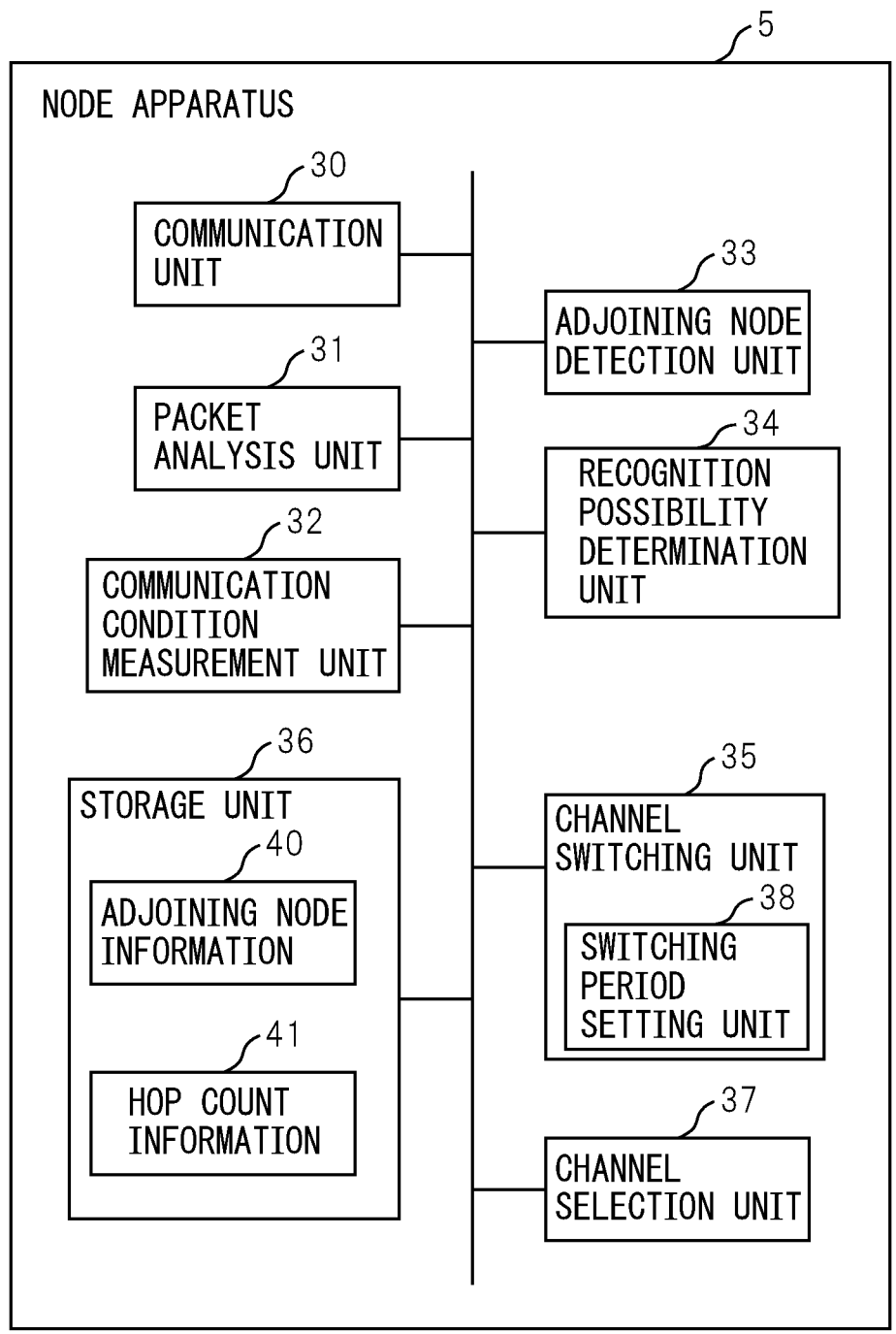
FIG. 16 is a view depicting a second example of the construction of a node apparatus.

FIG. 16 is a view depicting a second exemplary construction of a node apparatus 5. Same constituents as in FIG. 4 are denoted by same reference numerals. Operation of the constituents denoted by same reference numerals is the same unless otherwise indicated. Other examples may also include the constituents and functions as illustrated in FIG. 16.

The channel switching unit 35 includes a switching period setting unit 38. The switching period setting unit 38 sets channel switching period for the channel switching unit 35 to switch the channel as follows.

Immediately after the channel switching unit 35 switches the channel, the switching period setting unit 38 sets the channel switching period to a period T2. The channel switching period T2 may be a time length not shorter than the period for a node apparatus 5 to transmit packets. For example, a regular packet may be a route control packet such as a Hello packet. In an example, the channel switching period T2 is set to 120 seconds.

If a packet was received before the channel switching period T2 has elapsed, the switching period setting unit 38 sets a channel switching period T3 after the channel switching period T2 has elapsed. The channel switching period T3 may be a time length not shorter than the period for a gateway apparatus 6 to transmit flooding packets. In an example, the channel switching period T3 is set to, for example, 12 minutes. Thus, if there is packet reception from an adjoining mode, total channel switching period is 14 minutes.

On the other hand, if no packet was received until the channel switching period T2 has elapsed, the channel switching unit 35 switches the channel after the channel switching period T2 has elapsed. Therefore, if there is no packet reception from an adjoining node, the channel switching period is 2 minutes.

Figure 17:
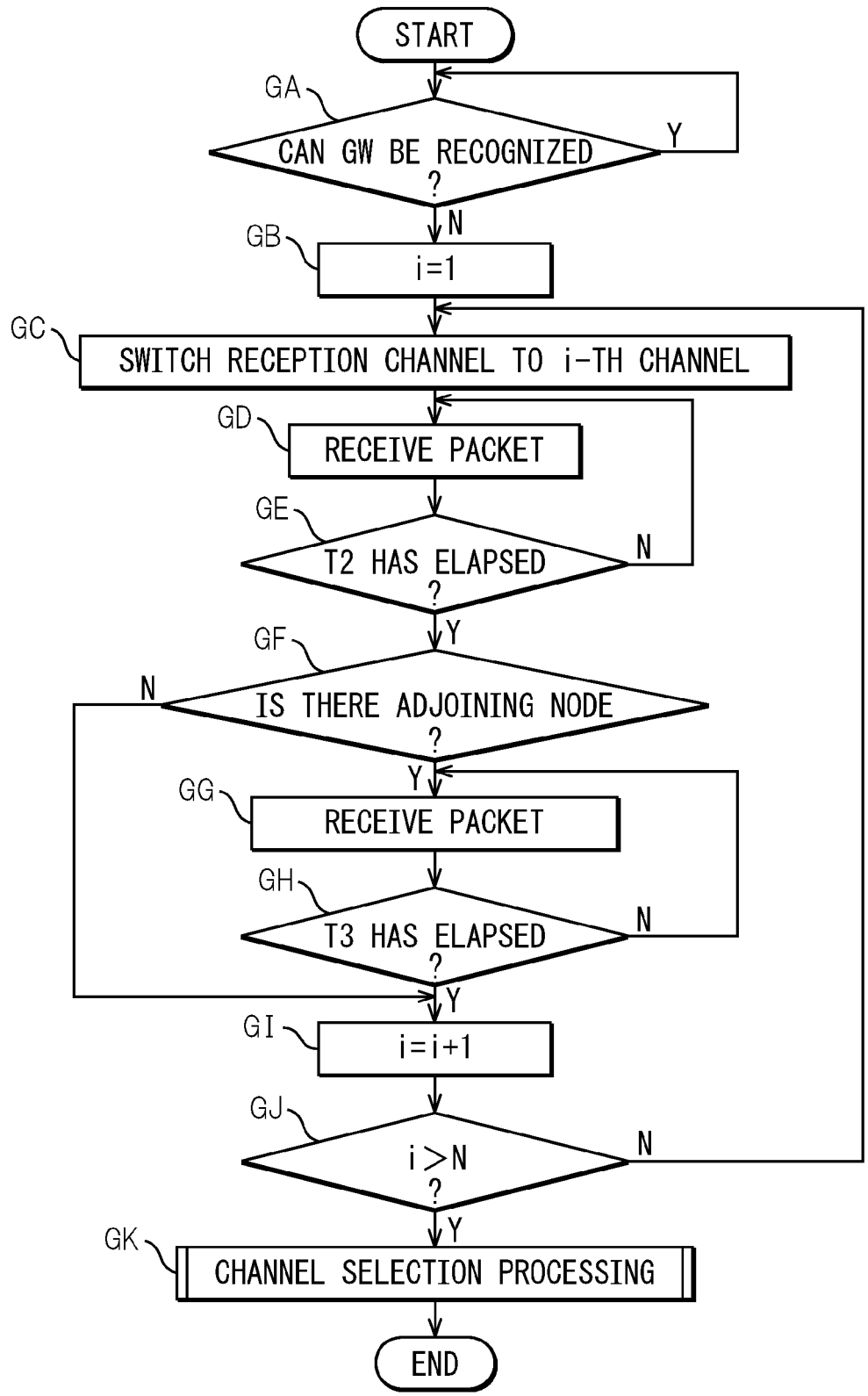
FIG. 17 is a view useful for illustrating a second example of the processing of a node apparatus.

Next, the channel retrieval processing of the node apparatus 5 according to the present embodiment will be described. FIG. 17 is a view useful for illustrating a second example of the processing of the node apparatus 5. In other embodiments, following operations GA~GK may be steps.

Processing in operations GA and GB is the same as the processing in operations AA and AB of FIG. 10. In operation GC, the channel switching unit 35 switches the channel being used by the communication unit 30 for reception of packets to the channel CHi. At this time, the switching period setting unit 38 sets the channel switching period to the period T2.

Processing in operation GD is same as the processing in operation AD of FIG. 10. In operation GE, the channel switching unit 35 determines whether or not the channel switching period T2 has elapsed. If the channel switching period T2 has not elapsed (operation GE: N), the processing returns to operation GD. If the channel switching period T2 has elapsed (operation GE: Y), the processing proceeds to operation GF.

In operation GF, the switching period setting unit 38 determines whether or not an adjoining node has been detected during the channel switching period T2. If an adjoining node has been detected (operation GF: Y), the switching period setting unit 38 sets the channel switching period to the period T3. Thereafter, the processing proceeds to operation GG. If an adjoining node has been detected (operation GF: Y), operations GG and GH are not executed, and the processing proceeds to operation GI.

The processing in operation GG is the same as the processing in operation GD. In operation GH, the channel switching unit 35 determines whether or not the channel switching period T3 has elapsed. If the channel switching period T3 has not elapsed (operation GH: N), the processing returns to operation GG. If the channel switching period T3 has elapsed (operation GH: Y), the processing proceeds to operation GI. The processing in operations GI~GK is the same as in operation AF to AH.

Figure 18:
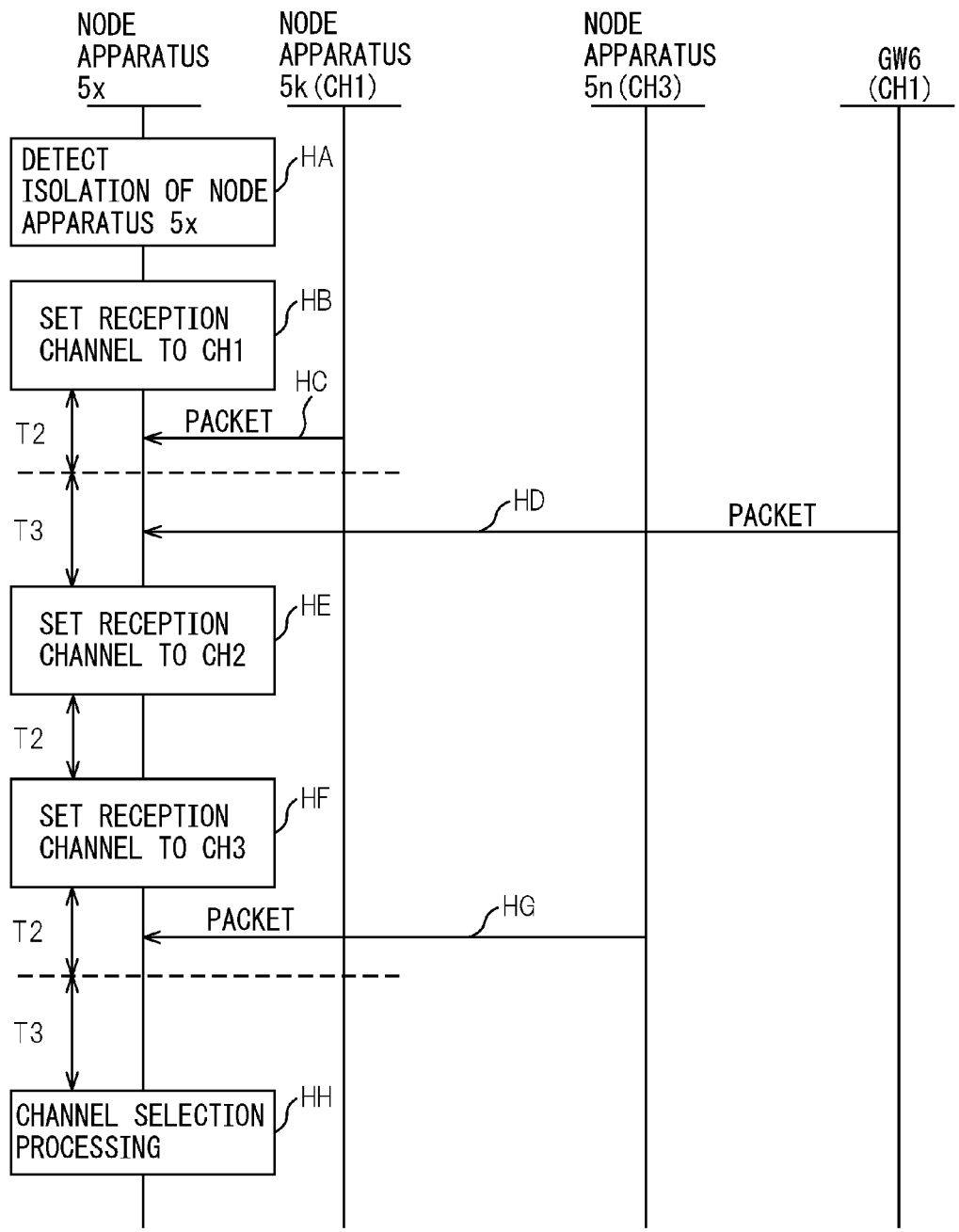
FIG. 18 is a view useful for illustrating channel switching in the processing of FIG. 17.

Next, channel switching by the channel switching unit 35 in the processing illustrated in FIG. 17 will be described. FIG. 18 is a view useful for illustrating channel switching in the processing of FIG. 17. In other embodiments, following operations HA~HH may be steps. Terms used in the node apparatus 5$x$ and node apparatuses 5$k$ and 5$n$ and the gateway apparatus 6 are same as has been described above with reference to FIG. 11.

In operation HA, the recognition possibility determination unit 34 of the node apparatus 5$x$ detects isolation of the node apparatus 5$x$. In operation HB, the channel switching unit 35 switches the channel being used by the communication unit 30 to the channel CH1.

Before channel switching period T2 has elapsed, in operation HC, the node apparatus 5$x$ receives packets from an adjoining node 5$k$. Therefore, the node apparatus 5$x$ extends the channel switching period by the period T3. Thereafter, in operation HD, the node apparatus 5$x$ receives flooding packets from the gateway apparatus 6.

After the channel switching period T3 has elapsed, in operation HE, the channel switching unit 35 switches the channel used by the communication unit 30 for reception of packets to the channel CH2. During the channel switching period T2 following the operation HE, no packet is received from adjoining nodes. As a result, after the channel switching period T2 has elapsed, in operation HF, the channel switching unit 35 switches the channel used by the communication unit 30 for reception of packets to the channel CH3.

Before channel switching period T2 has elapsed, in operation HG, the node apparatus 5$x$ receives packets from an adjoining node 5$n$. Therefore, the node apparatus 5$x$ extends the channel switching period by the period T3. After the channel switching period T3 has elapsed, in operation BI, the channel selection unit 37 selects a channel to be used for communication in the wireless ad-hoc network 4.

In accordance with the present embodiment, average length of channel switching period can be shortened in receiving packets from an adjoining node and flooding packets from the gateway apparatus 6 in each channel while switching the reception channel. Therefore, time for the node apparatus 5 to perform channel retrieval processing can be shortened.

<4. Third Embodiment>

Next, another embodiment will be described. Two modes can be considered for isolation of the node apparatus 5. Two modes are denoted as "single isolation" and "group isolation", respectively. Single isolation refers to the state that the node apparatus 5 cannot recognize any adjoining node, and as a result, cannot recognize the gateway apparatus 6. Group isolation refers to the state that the node apparatus 5 can recognize adjoining nodes, but the node apparatus 5 or any of the adjoining nodes cannot recognize the gateway apparatus 6.

Figure 19A:
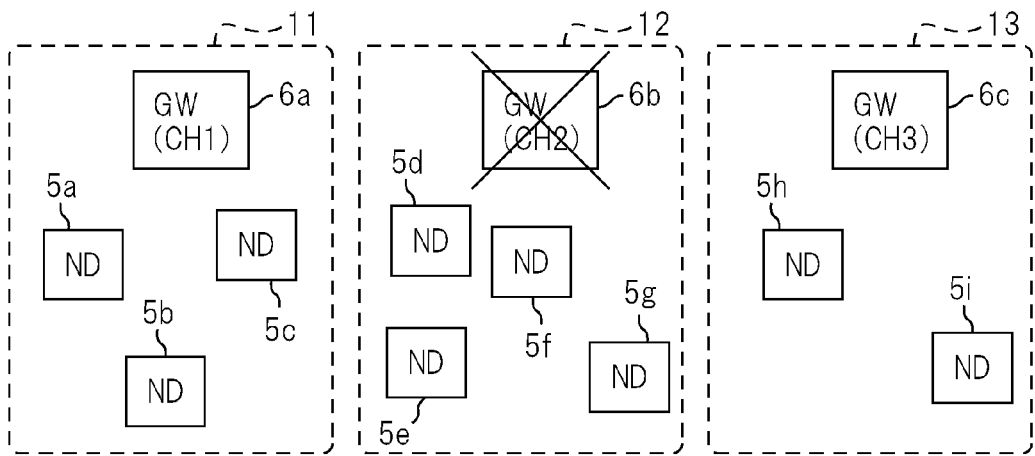
FIG. 19A is view useful for illustrating group isolation and single isolation.

FIG. 19A is a view useful for illustrating the state of group isolation. In the wireless ad-hoc network 4, the node apparatuses 5a~5c form a group 11 using the channel CH1, and the node apparatuses 5d~5g form a group 12 using the channel CH2. The node apparatuses 5h and 5i form a group 13 using the channel CH3.

In the example of FIG. 19A, the node apparatuses of the groups 11~13 recognize the gateway apparatuses 6a~6c, respectively. Suppose a case where node apparatuses 5d~5g become unable to recognize the gateway apparatus due to failure of the gateway apparatus 6b. Immediately after the failure of the gateway apparatus 6b, since the node apparatuses 5d~5g use same channel, the node apparatuses 5d~5g can recognize each other. Thus, the state of group isolation arises in which the node apparatuses 5d~5g recognize each other but cannot recognize the gateway apparatus.

Figure 19B:
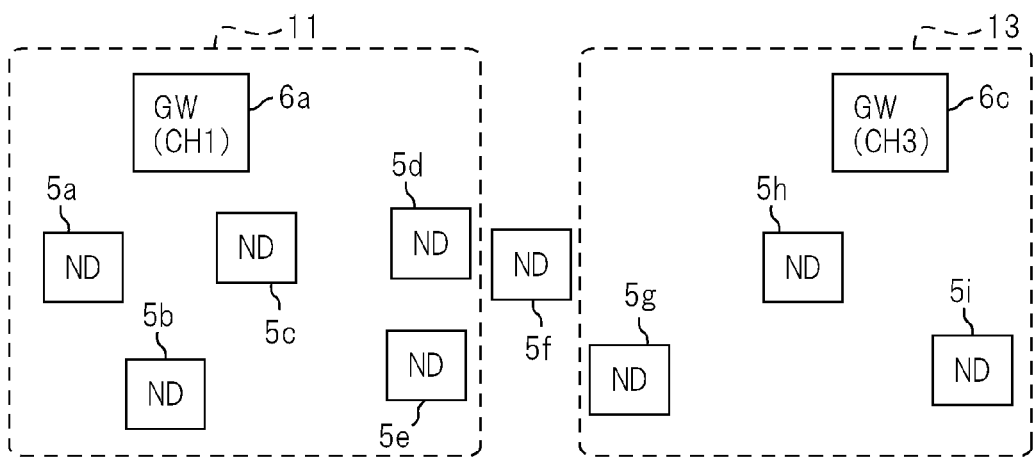
FIG. 19B is view useful for illustrating group isolation and single isolation.

FIG. 19B is a view useful for illustrating the state of single isolation. The node apparatuses 5a~5e form a group 11 using the channel CH1, and the node apparatuses 5g~5i form a group 13 using the channel CH3. The node apparatus 5f using the channel CH2 cannot recognize the node apparatus 5 in the group 11 and group 13, and cannot recognize the gateway apparatus 6.

In the state of group isolation, if, in a group of the node apparatuses 5 which can recognize each other, any one node apparatus 5 can recognize a gateway apparatus 6, all the node apparatuses 5 in the group can recognize the gateway apparatus 6. Therefore, in the state of group isolation, it is likely that communication with the gateway apparatus can be restored sooner if the node apparatuses 5 continue to use the channel being used to thereby maintain the group. Thus in the present embodiment, when the state of group isolation arises, the node apparatus 5 does not start channel retrieval immediately, but waits for a prescribed waiting period to elapse to start channel retrieval.

Figure 20:
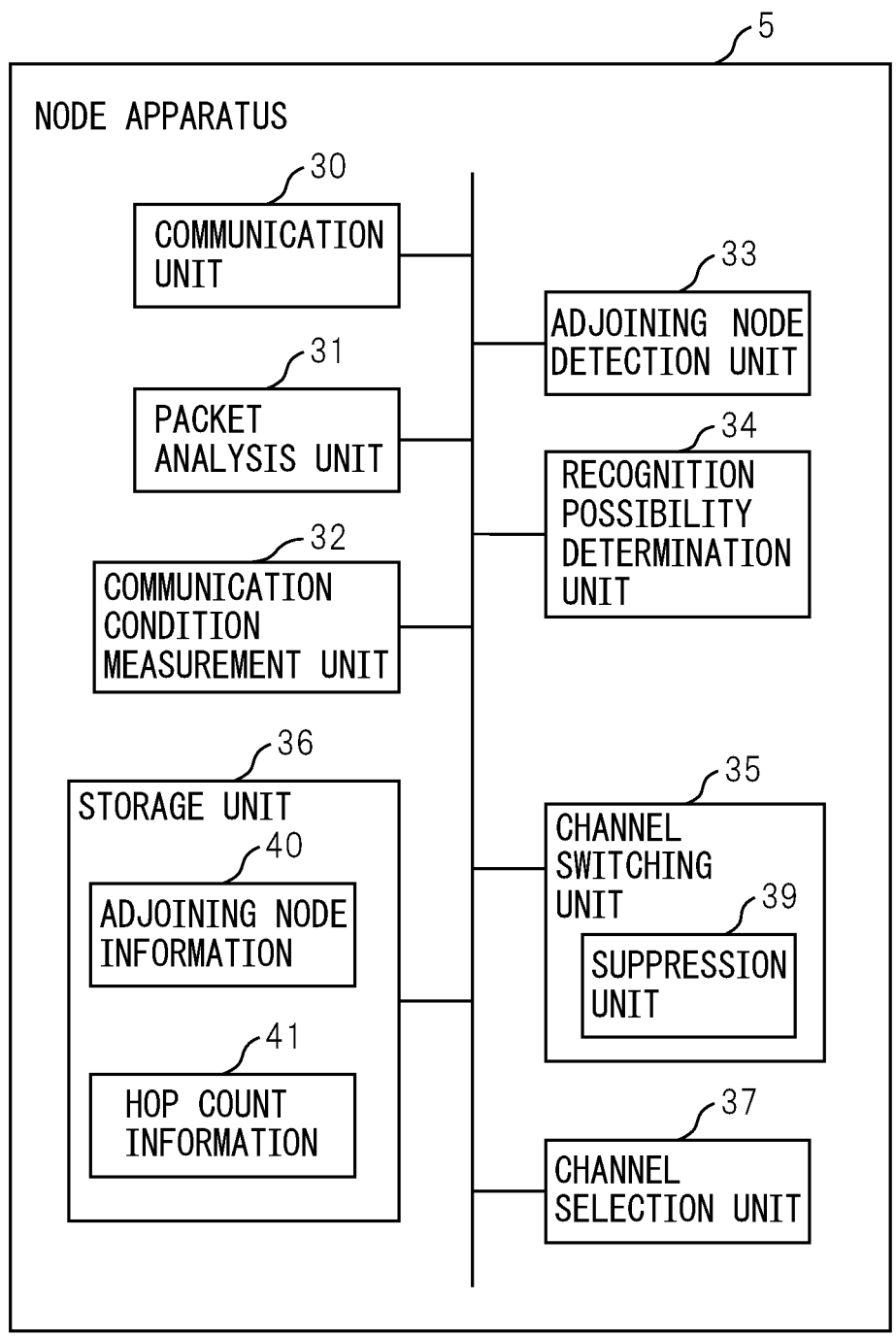
FIG. 20 is a view depicting a third exemplary construction of a node apparatus.

FIG. 20 is a view depicting a third exemplary construction of a node apparatus 5. Same constituents as the constituents depicted in FIG. 4 are denoted by same reference numerals, and operation of the same constituents denoted by same reference numerals is same unless otherwise indicated. Other example s may include same constituents as depicted in FIG. 20.

The channel switching unit 35 includes a suppression unit 39. The suppression unit 39 determines whether or not the adjoining node detection unit 33 has detected an adjoining node. Even if the recognition possibility determination unit 34 determines that no gateway apparatus 6 can be recognized in the present channel, when the adjoining node detection unit 33 has detected an adjoining node, the suppression unit 39 suppresses the channel switching processing by the channel switching unit 35 for a waiting period T4.

In an example, if any one gateway apparatus 6 can be recognized in the present channel, the suppression unit 39 may store the history that the gateway apparatus 6 was recognized in the storage unit 36. When no gateway apparatus 6 can be recognized in the present channel, the suppression unit 39 determines whether or not there is a history that a gateway apparatus 6 was recognized in the past. If there is no history that a gateway apparatus 6 was recognized in the past, the suppression unit 39 does not suppress the channel switching processing by the channel switching unit 35 even if an adjoining node is detected. This is because, if the gateway apparatus 6 was not recognized in the past, communication with the gateway apparatus is unlikely to be restored in the present channel.

Figure 21:
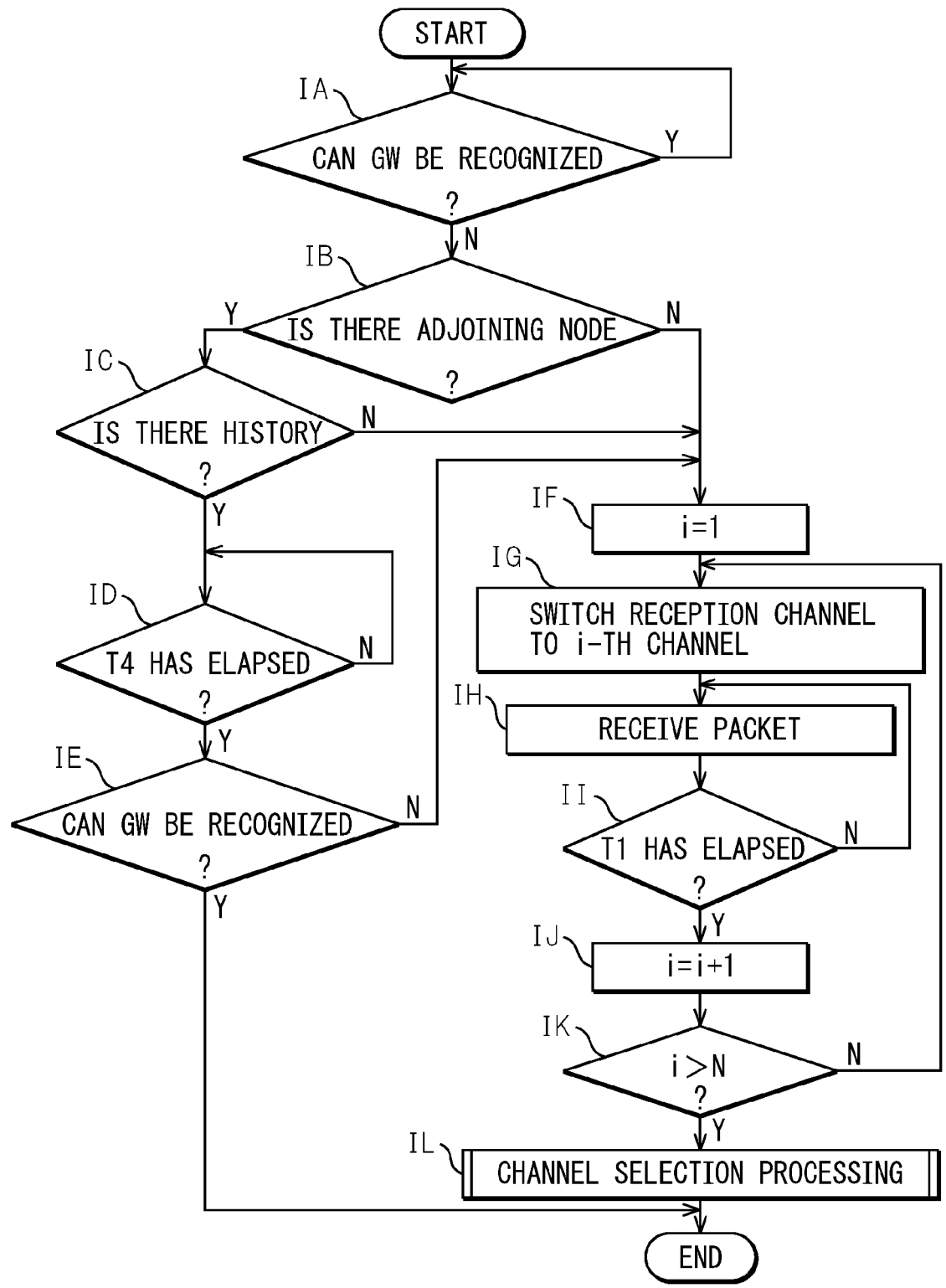
FIG. 21 is a view useful for illustrating a third example of the processing of a node apparatus.

The channel retrieval processing of the node apparatus 5 according to the present embodiment will be described. FIG. 21 is a view useful for illustrating a third example of the processing of the node apparatus 5. In other embodiments, following operations IA~IL may be steps.

The processing in operation IA is the same as the processing in operation AA of FIG. 10. In operation IB, the suppression unit 39 determines whether or not an adjoining node is detected. If an adjoining node is detected (operation IB: Y), the processing proceeds to operation IC. If an adjoining node is not detected (operation IB: Y), the processing proceeds to operation IF.

In operation IC, the suppression unit 39 determines whether or not there is a history that any gateway apparatus 6 was recognized in the present channel. If there is a history that any gateway apparatus 6 was recognized (operation IC: Y), the processing proceeds to operation ID. If there is no history that any gateway apparatus 6 was recognized (operation IC: N), the processing proceeds to operation IF.

In operation ID, the suppression unit 39 whether or not the waiting period T4 has elapsed. The suppression unit 39 repeats operation ID (operation ID: N) until the waiting period T4 has elapsed. If the waiting period T4 has elapsed (operation ID: Y), the processing proceeds to operation IE.

In operation IE, the recognition possibility determination unit 34 determines whether or not any gateway apparatus 6 can be recognized in the present channel. If a gateway apparatus 6 can be recognized (operation IE: Y), the processing is terminated. If no gateway apparatus 6 can be recognized (operation IE: N), The processing proceeds to operation IF. The processing in operations IF~IL is the same as the processing in operations AB~AH of FIG. 10.

In accordance with the present embodiment, when the state of group isolation arises, if, by continuing to use the present channel, a gateway apparatus 6 become recognizable, channel retrieval processing can be omitted. Therefore, in accordance with the present embodiment, unnecessary channel retrieval processing of the node apparatus 5 can be avoided.

<5. Fourth Embodiment>

Next, another embodiment will be described. In the first embodiment as described above, hop count to the gateway apparatus 6 in each channel is detected from the hop count 55 of the flooding packet transmitted from the gateway apparatus 6. In place of this, in the present embodiment, hop count to the gateway apparatus 6 is detected from the route control packet received from an adjoining node.

In order to detect hop count to the gateway apparatus 6 from the route control packet, each node apparatus 5 transmits a route control packet as illustrated with reference to FIG. 8. In an example, each node apparatus 5 designates hop count to the gateway apparatus 6 from this node apparatus 5 as additional information 62 added to the message part 60. The adjoining node detection unit 33 of a node apparatus 5 that received the route control packet from an adjoining node stores the adjoining node information as depicted in FIG. 22 in the storage unit 36.

FIG. 22 is a view depicting a second example of the adjoining node information 40. The adjoining node information 40 in the present embodiment includes an information element "hop count". As the example of the adjoining node information 40 depicted in FIG. 6, the adjoining node information element 40 may include information elements "channel" and "node identifier". In an example, the adjoining node information element 40 may include an information element indicating the communication condition.

In the example of FIG. 22, hop count through the adjoining node with node identifier "1" is "4", and hop count through the adjoining node with node identifier "109" is "5". The adjoining node detection unit 33 sets a value obtained by adding 1 to hop count stored in the additional information 62 of the message part 60 as the value of information element "hop count".

In other embodiment, each node apparatus 5 may designate a value obtained by adding 1 to hop count from this node apparatus 5 to the gateway apparatus 6 as the additional information 62 of the message part 60. In this case, the adjoining node detection unit 33 of the node apparatus 5 receiving the route control packet sets the value of hop count stored in the additional information 62 of the message part 60 as it is as the value of the information element "hop count".

When plural adjoining nodes are detected in one channel, hop counts through respective nodes are different from each other. The channel selection unit 37 may use the shortest hop count from among hop counts through adjoining nodes satisfying a prescribed communication condition in order to specify hop count to the gateway apparatus 6 in each channel.

In accordance with the present embodiment, it is possible to obtain hop count to the gateway apparatus 6 by using, in place of a flooding packet transmitted the gateway apparatus 6, a route control packet from an adjoining node.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A node apparatus for forming a wireless ad-hoc network, the node apparatus comprising:
a recognition possibility determination unit that determines whether or not a gateway apparatus connecting said wireless ad-hoc network to another network can be recognized;
an adjoining node detection unit that detects another node apparatus which is a source of a received packet as an adjoining node;
a channel switching unit that switches, when said recognition possibility determination unit determines that said gateway apparatus cannot be recognized, a reception channel used for reception of packets transmitted in said wireless ad-hoc network successively to each of a plurality of channels; and
a channel selection unit that selects a communication channel to be used for communication in said wireless ad-hoc network based on a number of adjoining nodes detected by said adjoining node detection unit in each of said plurality of channels, the channel selection unit selecting the communication channel used by a largest number of the adjoining nodes from among some of said plurality of channels when the number of adjoining nodes in the some of said plurality of channels does not exceed a threshold, and selecting the communication channel used by a smallest number of the adjoining nodes from among said plurality of channels when the number of adjoining nodes in said plurality of channels exceeds the threshold.

2. The node apparatus according to claim 1, wherein, when no adjoining node has been detected within a first period after the reception channel was changed to the communication channel, said channel selection unit switches the communication channel to a next channel after the first period has elapsed, and when an adjoining node has been detected within the first period, switches the communication channel to the next channel after a second period, longer than the first period, has elapsed.

3. The node apparatus according to claim 1, wherein, when an adjoining node has been detected, said channel switching unit starts switching of channels after a certain waiting period has elapsed.

4. The node apparatus according to claim 3,
further comprising a recognition history storage unit that stores a history of when said recognition possibility determination unit determined that said gateway apparatus could be recognized,
wherein, when said history does not exist, said switching of channels is started before said waiting period has elapsed.

5. The node apparatus according to claim 1, wherein said recognition possibility determination unit determines whether or not said gateway apparatus can be recognized in each of plurality of channels while said channel switching unit switches channels, and
wherein said channel selection unit selects the communication channel to be used from among channels in which said gateway apparatus can be recognized.

6. The node apparatus according to claim 5, wherein said recognition possibility determination unit selects the communication channel to be used based on hop count to a recognizable gateway apparatus in each of said channels and on the number of adjoining nodes detected in each of said channels.

7. The node apparatus according to claim 1, wherein said channel selection unit selects the communication channel to be used based on the number of adjoining nodes with the reception condition for receiving packets transmitted from the adjoining nodes satisfying a condition from among the adjoining nodes detected in each of said channels.

8. A communication system comprising:
a plurality of node apparatuses forming a wireless ad-hoc network and a gateway apparatus connecting the wireless ad-hoc network to another network, wherein each of said node apparatuses comprises:
a recognition possibility determination unit that determines whether or not said gateway apparatus can be recognized;
an adjoining node detection unit that detects other node apparatus which is the source of a received packet as an adjoining node;
a channel switching unit that switches, when said recognition possibility determination unit determines that said gateway apparatus cannot be recognized, a reception channel used for reception of packets successively to each of a plurality of channels; and
a channel selection unit that selects a communication channel to be used for communication in said wireless ad-hoc network based on a number of adjoining nodes detected by said adjoining node detection unit in each of said plurality of channels, the channel selection unit selecting the communication channel used by a largest number of the adjoining nodes from among some of said plurality of channels when the number of adjoining nodes in the some of said plurality of channels does not exceed a threshold, and selecting the communication channel used by a smallest number of the adjoining nodes from among said plurality of channels when the number of adjoining nodes in said plurality of channels exceeds the threshold.

9. A channel selection method for selecting a channel used by a node apparatus in a wireless ad-hoc network, the channel selection method comprising:

- determining whether or not said node apparatus can recognize a gateway apparatus connecting said wireless ad-hoc network to another network;
- switching, when said gateway apparatus cannot be recognized, a channel used by said node apparatus for receiving packets transmitted in said wireless ad-hoc network successively to each of a plurality of channels;
- detecting adjoining nodes transmitting packets to said node apparatus in each of said plurality of channels; and
- selecting a communication channel to be used for communication in said wireless ad-hoc network from among said plurality of channels based on a number of adjoining nodes detected in each of said plurality of channels, the selecting including selecting the communication channel used by a largest number of the adjoining nodes from among some of said plurality of channels when the number of adjoining nodes in the some of said plurality of channels does not exceed a threshold, and selecting the communication channel used by a smallest number of the adjoining nodes from among said plurality of channels when the number of adjoining nodes in said plurality of channels exceeds the threshold.

10. A node apparatus for forming a wireless ad-hoc network, the node apparatus comprising:

- a recognition possibility determination unit that determines whether a gateway apparatus connecting said wireless ad-hoc network to another network can be recognized;
- an adjoining node detection unit that detects another node apparatus which is a source of a received packet as an adjoining node;
- a channel switching unit that switches, when said recognition possibility determination unit determines that said gateway apparatus cannot be recognized, a reception channel used for reception of packets transmitted in said wireless ad-hoc network successively to each of a plurality of channels; and
- a channel selection unit that selects a communication channel to be used for communication in said wireless ad-hoc network based on a number of adjoining nodes detected by said adjoining node detection unit in each of said plurality of channels and, when no adjoining node has been detected within a first period after the reception channel was changed to the communication channel, said channel selection unit switches the communication channel to a next channel after the first period has elapsed, and when an adjoining node has been detected within the first period, switches the communication channel to the next channel after a second period, longer than the first period, has elapsed.

* * * * *